United States Patent
Rho et al.

(10) Patent No.: US 12,025,243 B2
(45) Date of Patent: Jul. 2, 2024

(54) REFRIGERANT PIPE FITTING AND REFRIGERANT PIPE FITTING METHOD USING THEREOF

(71) Applicant: LG Electronics Inc., Seoul (KR)

(72) Inventors: Namsu Rho, Seoul (KR); Dongkyun Ko, Seoul (KR); Sihyun Sung, Seoul (KR); Chaemoon Lee, Seoul (KR); Seonwook Bang, Seoul (KR); Kiho Kang, Seoul (KR); Jaehun Kim, Seoul (KR); Daeyong Seong, Seoul (KR)

(73) Assignee: LG Electronics Inc., Seoul (KR)

( * ) Notice: Subject to any disclaimer, the term of this patent is extended or adjusted under 35 U.S.C. 154(b) by 907 days.

(21) Appl. No.: 16/975,893

(22) PCT Filed: Feb. 25, 2019

(86) PCT No.: PCT/KR2019/002296
§ 371 (c)(1),
(2) Date: Aug. 26, 2020

(87) PCT Pub. No.: WO2019/164376
PCT Pub. Date: Aug. 29, 2019

(65) Prior Publication Data
US 2021/0003326 A1    Jan. 7, 2021

(30) Foreign Application Priority Data
Feb. 26, 2018    (KR) .................. 10-2018-0022850

(51) Int. Cl.
*F25B 39/00*    (2006.01)
*F16L 13/14*    (2006.01)
(Continued)

(52) U.S. Cl.
CPC ............ *F16L 13/146* (2013.01); *F25B 41/40* (2021.01); *F25B 39/00* (2013.01); *F25B 41/37* (2021.01);
(Continued)

(58) Field of Classification Search
CPC ..... F16L 13/142; F16L 13/143; F16L 13/146; F25B 41/40
See application file for complete search history.

(56) References Cited

U.S. PATENT DOCUMENTS

| | | | | |
|---|---|---|---|---|
| 2,027,962 | A | * | 1/1936 | Currie .................... F16L 47/22 138/140 |
| 3,149,860 | A | * | 9/1964 | Hallesy ................. F16L 13/146 29/432 |

(Continued)

FOREIGN PATENT DOCUMENTS

| | | | | |
|---|---|---|---|---|
| DE | 4412615 | A1 * | 11/1994 | ............ F16L 13/146 |
| DE | 10133183 | C1 * | 11/2002 | ............ F16L 13/146 |

(Continued)

*Primary Examiner* — Zachary T Dragicevich
*Assistant Examiner* — James A Linford
(74) *Attorney, Agent, or Firm* — Fish & Richardson P.C.

(57) ABSTRACT

According to an embodiment of the present disclosure, a refrigerant pipe fitting, the fitting having a pipe shape with a hollow to connect a pipe, may include an out pipe opening which is opened at one end of the fitting and into which an out pipe is inserted; an inner pipe opening which is opened at the other end of the fitting and into which an inner pipe is inserted to be inserted into the out pipe inside the fitting; a pressing portion which is configured to form a part of an inner surface of the fitting and formed to have a narrower inner diameter as it extends toward the inner pipe opening to press and deform the out pipe to allow the out pipe to connect with the inner pipe in movement of the fitting; and a fastening portion which is formed on the inner surface of (Continued)

the fitting between the pressing portion and the out pipe opening to constrain an end of the out pipe to prevent the fitting from being separated.

20 Claims, 24 Drawing Sheets

(51) Int. Cl.
  *F25B 41/40* (2021.01)
  *F25B 41/37* (2021.01)
  *F25B 43/00* (2006.01)
(52) U.S. Cl.
  CPC .......... *F25B 43/003* (2013.01); *F25B 43/006* (2013.01); *F25B 2500/221* (2013.01)

(56) References Cited

U.S. PATENT DOCUMENTS

| | | | | |
|---|---|---|---|---|
| 3,320,355 A | * | 5/1967 | Booker | H01R 4/726 |
| | | | | 228/56.3 |
| 3,498,648 A | * | 3/1970 | Hallesy | F16L 13/146 |
| | | | | 403/82 |
| 3,528,689 A | * | 9/1970 | Roe | F16L 13/146 |
| | | | | 285/382.2 |
| 4,141,576 A | * | 2/1979 | Lupke | B29C 66/1122 |
| | | | | 285/903 |
| 4,650,228 A | * | 3/1987 | McMills | H01R 9/0518 |
| | | | | 174/DIG. 8 |
| 4,911,484 A | | 3/1990 | Hackforth | |
| 2013/0270821 A1 | * | 10/2013 | Haener | F16L 13/146 |
| | | | | 285/382 |
| 2018/0266597 A1 | | 9/2018 | Bae et al. | |

FOREIGN PATENT DOCUMENTS

| | | | | |
|---|---|---|---|---|
| GB | 1399047 A | * | 6/1975 | ............ F16L 13/146 |
| JP | S6163330 | | 4/1986 | |
| JP | 2701060 | | 1/1998 | |
| KR | 1020030076817 | | 9/2003 | |
| KR | 2020150001544 | | 4/2015 | |
| KR | 101682703 | | 12/2016 | |

* cited by examiner

REFRIGERANT PIPE FITTING AND REFRIGERANT PIPE FITTING METHOD USING THEREOF

TECHNICAL FIELD

The present disclosure relates to a refrigerant pipe fitting and a pipe fitting method using the same.

BACKGROUND

Refrigerant pipes of a refrigerator, an air conditioner or the like may carry refrigerant, connect components constituting a refrigeration cycle, and guide the flow of the refrigerant. In some cases, the refrigerant pipes may have a structure in which the refrigerant pipes are connected to each other in the assembly or installation of the refrigerator or air conditioner.

In some cases, the connection of refrigerant pipes may be made by welding.

FIGS. 1A to 1E are views sequentially showing an example of a process of connecting refrigerant pipes in related art.

As shown in FIGS. 1A to 1E, a forming end 1a is formed and prepared at an end of one pipe 1 of pipes 1 and 2 on both sides for connection, and a fitting 3 is processed and a sealing agent 4 is prepared (FIG. 1A). Then, the other pipe 2 of the pipes 1 and 2 on both sides is arranged to pass through the fitting 3 (FIG. 1B). Then, a sealing agent 4a is provided on the outer surface of the pipe 2 after moving the fitting 3 in order to apply the sealing agent 4a on the outer surface of the pipe 2 (FIG. 1C). In addition, in a state in which the sealing agent 4a is applied, the pipe 2 is inserted into the pipe 1 on the other side (FIG. 1D). Then, the fitting 3 is moved out of the pipe 1 on the other side into which the pipe 2 on one side is inserted to pressurize and deform the pipe 1 so that the pipes 1 and 2 on both sides remain connected to each other (FIG. 1E).

In the related art, all processes for connecting the pipes 1 and 2 are continuously performed, which may increase time to connect the pipes 1 and 2 on both sides due to the relatively many processes.

In some cases, where the sealing agent 4a is applied in the state in which the fitting 3 is disposed, the application of the sealing agent 4a for the connection work may be done manually, which may lead to quality variations depending on the skill of the worker.

In some cases, in order to connect the pipes 1 and 2, the pipes 1 and 2 for connection, it may be required to maintain the fitting 3, and the sealing agent 4a, and the like in a state in which they are disposed, which may decrease productivity due to reduction in workability and cumbersome work.

In some environment where a working space is narrow or difficult to work, it may not be easy to connect the pipes 1 and 2 due to additional work such as installation of the fitting 3 and application of the sealing agent 4a.

SUMMARY

The present disclosure describes a refrigerant pipe fitting and a pipe fitting method using the same, which may reduce pipe connection operation time by simplifying a pipe connection operation process.

The present disclosure also describes a refrigerant pipe fitting and a pipe fitting method using the same, which may maintain a uniform quality in connecting pipes by a fitting.

The present disclosure further describes a refrigerant pipe fitting and a pipe fitting method using the same, in which pipes and a fitting are provided in a temporarily assembled, thereby making it easy and simple to connect the pipes.

The present disclosure further describes a refrigerant pipe fitting and a pipe fitting method using the same, in which pipes connected by the fitting may be maintained firmly.

According to one aspect of the subject matter described in this application, a refrigerant pipe fitting is configured to connect to one or more pipes and includes an out pipe opening defined at a first end of the refrigerant pipe fitting and configured to receive an out pipe, an inner pipe opening defined at a second end of the refrigerant pipe fitting and configured to receive an inner pipe that is configured to be inserted into the out pipe disposed inside the refrigerant pipe fitting, a pressing portion that defines a part of an inner surface of the refrigerant pipe fitting, and a fastening portion defined on the inner surface of the refrigerant pipe fitting between the pressing portion and the out pipe opening. The refrigerant pipe fitting has an inner diameter that becomes narrower in a direction from the out pipe opening toward the inner pipe opening, and is configured to press and deform the out pipe toward the inner pipe based on moving relative to the out pipe to connect the out pipe with the inner pipe. The fastening portion is configured to couple to an end of the out pipe to thereby restrict separation of the out pipe from the refrigerant pipe fitting.

Implementations according to this aspect may include one or more of the following features. For example, the fastening portion may include a hook that protrudes inward and configured to be caught by an expanded pipe portion disposed at the end of the out pipe. In some examples, the fastening portion may further include a receiving portion that defines a recessed space between the hook and the pressing portion and is configured to accommodate the expanded pipe portion of the out pipe.

In some examples, the inner diameter of the refrigerant pipe fitting at the pressing portion may be less than an outer diameter of the out pipe. In some examples, the inner pipe opening may be configured to receive a punch that is configured to form the expanded pipe portion of the out pipe in a state in which the end of the out pipe is located inside the fastening portion.

In some implementations, the refrigerant pipe fitting may further include a tail portion configured to receive the expanded pipe portion of the out pipe and disposed between the pressing portion and the inner pipe opening, where the inner diameter of the refrigerant pipe fitting at the tail portion is larger than the inner diameter of the refrigerant pipe fitting at the pressing portion.

In some implementations, the refrigerant pipe fitting may further include a breakaway preventing portion that is stepped or rounded from the inner surface of the refrigerant pipe fitting and disposed between the pressing portion and the tail portion, the breakaway preventing portion being configured to contact an outer surface of the out pipe to thereby restrict one-directional movement of the refrigerant pipe fitting. In some examples, an end of the tail portion may be configured to face and support the punch, the end of the tail portion defining a maximum thickness of the refrigerant pipe fitting among an entire portion of the refrigerant pipe fitting.

In some implementations, the refrigerant pipe fitting may be axially symmetric with respect to an axis extending in the direction from the out pipe opening toward the inner pipe opening. In some implementations, the inner diameter of the refrigerant pipe fitting at the fastening portion may be larger than each of an outer diameter of the out pipe and the inner diameter of the refrigerant pipe fitting at the pressing portion, and the fastening portion may be configured to couple to an adhesive applied between an outer surface of the out pipe and an inner surface of the fastening portion.

In some implementations, the inner diameter of the refrigerant pipe fitting at the fastening portion may be larger than each of an outer diameter of the out pipe and the inner diameter of the refrigerant pipe fitting at the pressing portion, and the fastening portion may be configured to couple to a fastening member that is disposed between an outer surface of the out pipe and an inner surface of the fastening portion, the fastening member being configured to contact the out pipe and the fastening portion.

In some implementations, the refrigerant pipe fitting may include a fastening retaining member configured to contact an outer circumferential surface of the refrigerant pipe fitting and to maintain a state in which the out pipe is inserted into the out pipe opening and fastened to the refrigerant pipe fitting. In some examples, the fastening retaining member may include a tube that has elasticity and is configured to surround each of a part of the refrigerant pipe fitting and a part of the out pipe inserted into the refrigerant pipe fitting, the inner pipe opening being configured to be disposed outside the tube.

In some implementations, the refrigerant pipe fitting may include an outer groove recessed from an outer peripheral surface of the refrigerant pipe fitting, and the fastening retaining member may include a pipe fixing portion configured to couple to the out pipe, a fitting fixing portion configured to couple to the outer groove, and a fixing portion connecting portion that connects the pipe fixing portion to the fitting fixing portion and is configured to receive a stepped boundary between the out pipe and the refrigerant pipe fitting.

In some implementations, the pressing portion may include a plurality of inclined portions that are arranged along an axis extending from the out pipe opening toward the inner pipe opening and have a plurality of slopes with respect to the axis, and the plurality of slopes may decrease from the out piping opening toward the inner pipe opening.

In some implementations, the refrigerant pipe fitting may include a crimping portion that is disposed at an end of the pressing portion facing the inner pipe opening and defines a minimum inner diameter of the refrigerant pipe fitting, where the crimping portion may be configured to fasten the out pipe and the inner pipe to each other.

In some implementations, the refrigerant pipe fitting may be configured to connect refrigerant pipes to each other, where the refrigerant pipes are configured to guide refrigerant through a refrigeration cycle of a refrigerator. In some examples, the refrigerant pipe fitting may be configured to be fastened to the out pipe, where the out pipe may be a part of at least one of a compressor, a condenser, an evaporator, a capillary tube, a dryer, or an accumulator that is connected to the refrigerant pipes.

In some implementations, the refrigerant pipe fitting may be configured to receive the inner pipe that is inserted into the out pipe and has a sealing agent applied between an outer surface of the inner pipe and an inner surface of the out pipe.

According to another aspect, a pipe fitting method includes providing a refrigerant pipe fitting, inserting an out pipe into a fastening portion defined at an inner surface of the refrigerant pipe fitting, inserting a punch into the refrigerant pipe fitting to expand an end of the out pipe toward the fastening portion, providing an inner pipe having a sealing agent applied on an end of the inner pipe, inserting the inner pipe into an opening of the refrigerant pipe fitting to insert the end of the inner pipe into the out pipe inside the refrigerant pipe fitting, and based on the end of the inner pipe being inserted into the out pipe, moving the refrigerant pipe fitting toward the out pipe to thereby press and deform the out pipe toward the inner pipe to fasten the out pipe and the inner pipe to each other.

In some implementations, the fitting may be provided in a temporarily fastened state to the fastening portion of the out pipe. Therefore, a worker may connect the out pipe and the inner pipe with a simple operation of moving the fitting after inserting the inner pipe into the out pipe to which the fitting is temporarily fastened, thereby improving work convenience and shortening the working time to increase productivity significantly.

In some implementations, when assembling devices including a refrigeration cycle, an additional process such as applying a sealing agent after the worker inserts the fitting in an appropriate position and moves the fitting is unnecessary by providing the fitting in a temporarily fastened state to the out pipe and the work is simplified, thus expecting remarkable improvement in assembly workability.

In some implementations, where the fitting is provided in a state of being fastened to the out pipe, the sealing agent applied to the inner pipe may not be affected by the fitting, and may be coated by an automated process or a separate device rather than a user's manual work, thus improving workability as well as preventing defects and maintaining quality performance.

In some implementations, where the fitting is provided in a state in which the fitting is temporarily fastened to the out pipe, there may be an advantage that the operation for connection of the inner pipe may be simply made by merely inserting the inner pipe even in a narrow installation space such as inside a narrow machine room.

In some implementations, when the length of the out pipe and/or the inner pipe is long or has a complicated shape, the work may be completed by inserting the inner pipe and moving the fitting regardless of the structure and shape, thereby further improving work convenience.

In some implementations, the expanded pipe portion, which is expended when the out pipe is temporarily fastened, may be caught with and fixed to the breakaway preventing portion of the fitting in a state in which the fitting is moved in order to completely fasten the out pipe and the inner pipe, so that the fitting is fixed not to break away when moved in order to fully fasten the out pipe and the inner pipe, thus maintaining the connection of the fitting even in an environment in which high pressure refrigerant flows or vibration occurs.

DETAILED DESCRIPTION

Figure 1A:
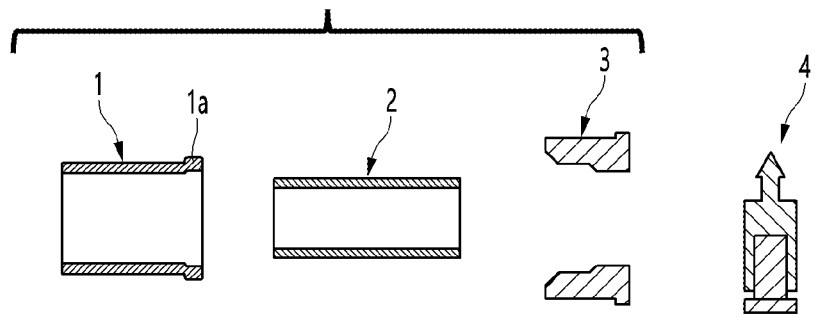
FIGS. 1A to 1E are views sequentially showing an example of a process of connecting refrigerant pipes in related art.
Figure 1B:
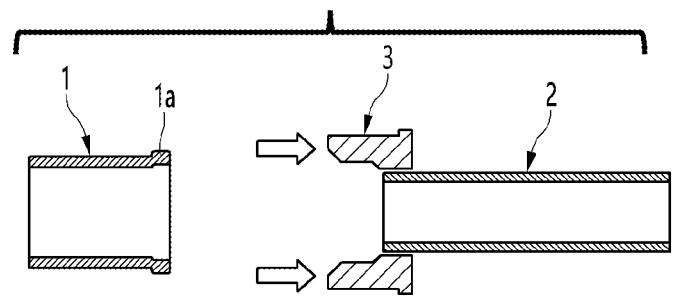
Figure 1C:
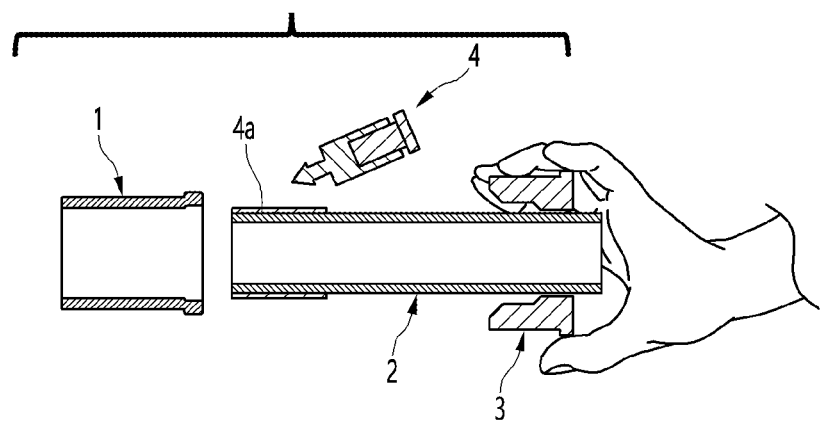
Figure 1D:
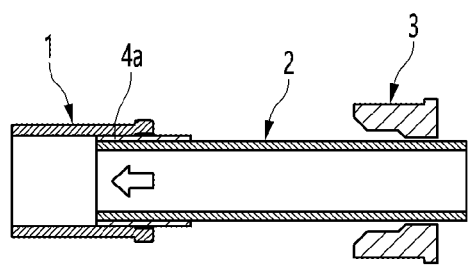
Figure 1E:
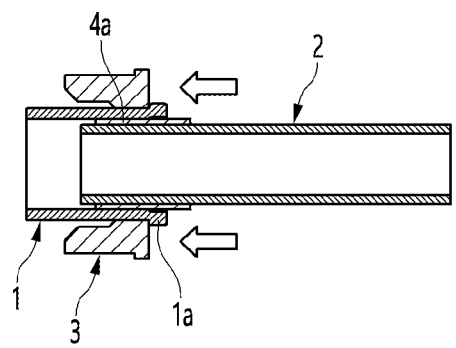

Hereinafter, one or more implementations of the present disclosure will be described in detail with reference to the accompanying drawings. It should be noted that when components in the drawings are designated by reference numerals, the same components have the same reference numerals as far as possible even though the components are illustrated in different drawings. Further, in description of implementations of the present disclosure, when it is determined that detailed descriptions of well-known configurations or functions disturb understanding of the implementations of the present disclosure, the detailed descriptions will be omitted.

Hereinafter, specific implementations of the present disclosure will be described in detail with reference to the drawings. However, the present disclosure may, however, be embodied in many different forms and should not be construed as limited to the example implementations set forth herein. Rather, the described aspect is intended to embrace all such alterations, modifications, and variations that fall within the scope and novel idea of the present disclosure.

Figure 2:
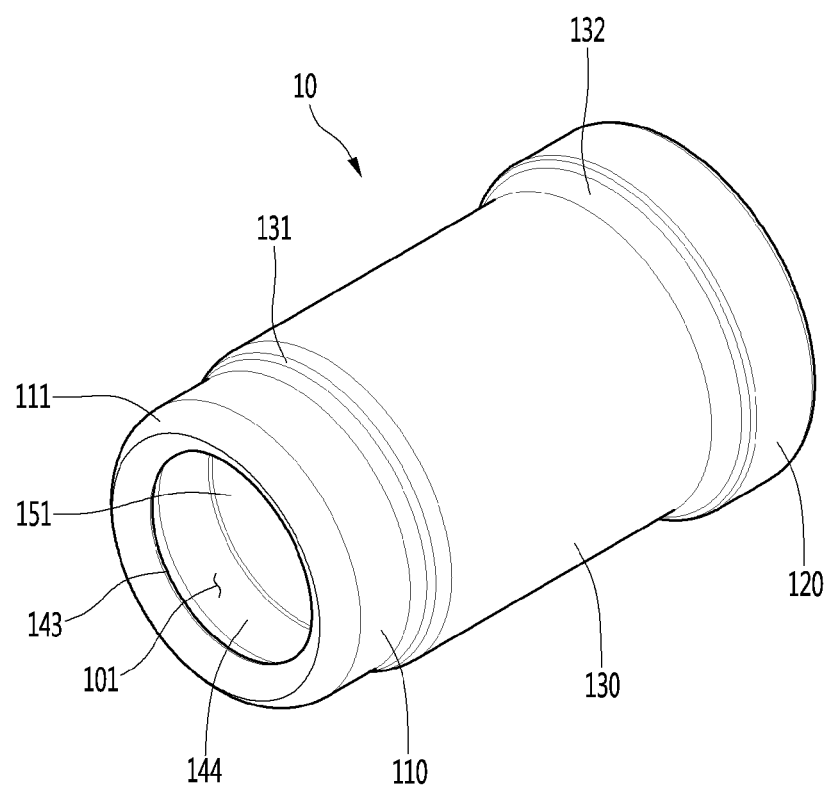
FIG. 2 is a perspective view illustrating a pipe fitting according to the present disclosure.
Figure 3:
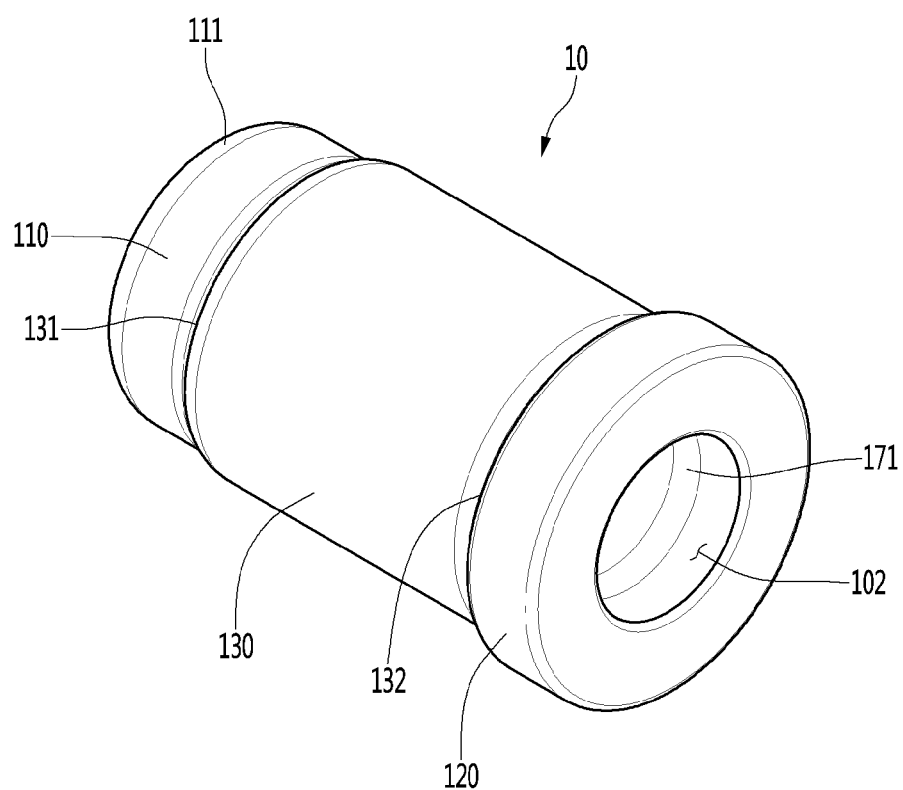
FIG. 3 is a perspective view illustrating example portions of the pipe fitting.
Figure 4:
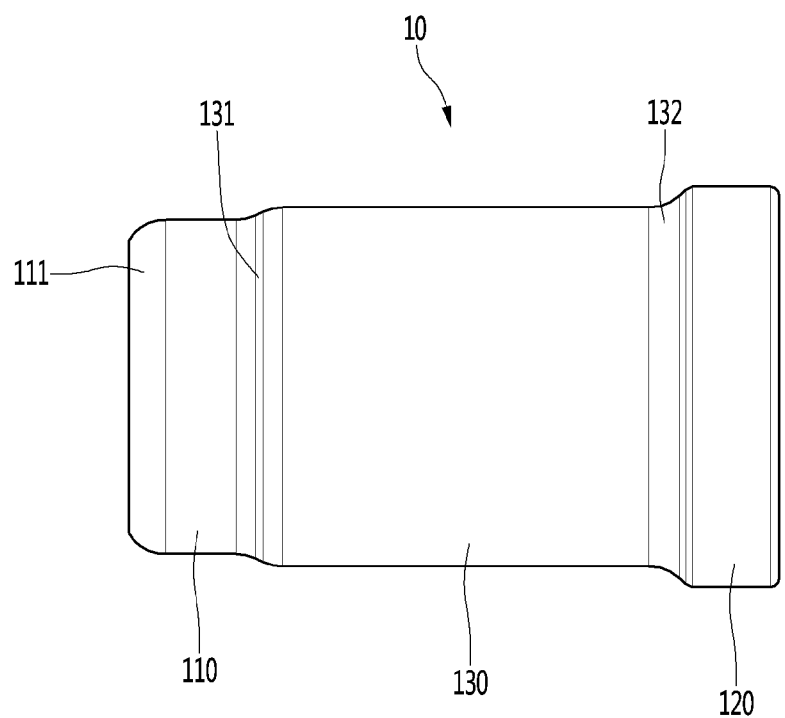
FIG. 4 is a front view of the fitting portion.
Figure 5:
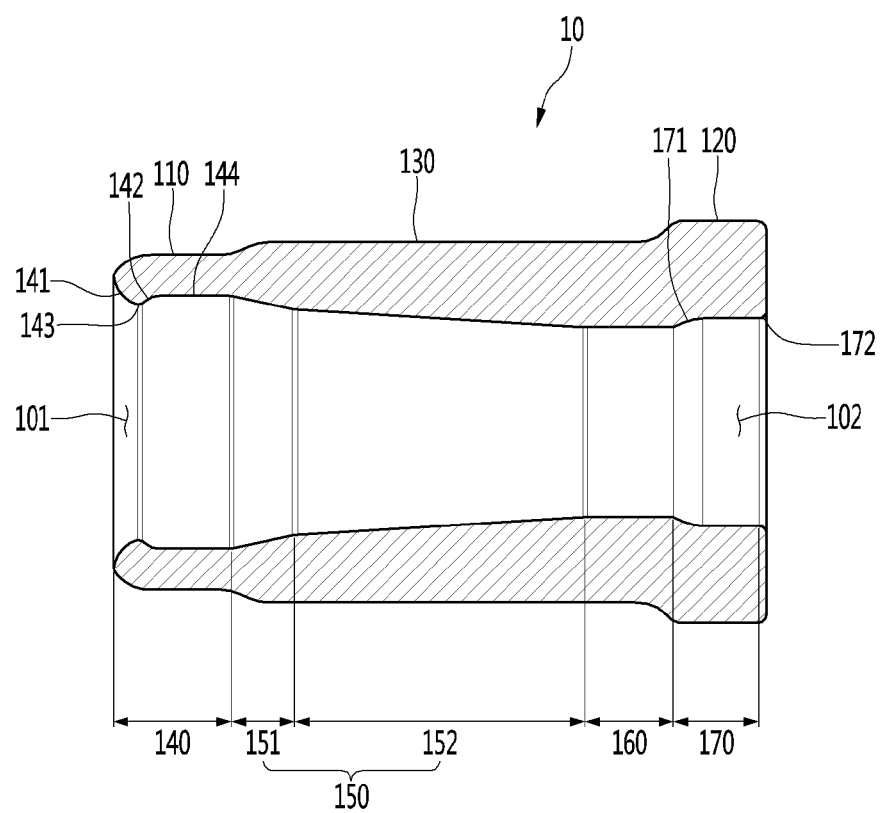
FIG. 5 is a cross-sectional view of the pipe fitting of FIG. 4.

FIG. 2 is a perspective view illustrating an example pipe fitting portion viewed from one side. FIG. 3 is a perspective view illustrating the pipe fitting viewed from the other side. FIG. 4 is a front view of the fitting portion. FIG. 5 is a cross-sectional view of the pipe fitting of FIG. 4.

In some implementations, a pipe fitting or a fitting 10 may be made of a metal material, and may have a cylindrical tube or tube shape with both sides open. An out pipe 20 and an inner pipe 30 made of a metal material may be inserted into the fitting 10 and may be connected to each other in the inside of the fitting 10. The fitting 10 may be made of, for example, not limited to, a ceramic material, a plastic material, or the like, and may be molded through a multi-step forging process when the fitting 10 is formed of a metal material.

In some examples, an out pipe opening 101 and an inner pipe opening 102 may be formed at both ends of the fitting 10, respectively. As shown in FIGS. 1A to 1E, the out pipe opening 101 into which the out pipe 20 is inserted may be formed at the left end of the fitting 10. In some examples, as shown in FIG. 2, the inner pipe opening 102 into which the inner pipe 30 is inserted may be formed at the right end of the fitting 10.

The outer surface of the fitting 10 may have a pipe insertion portion 110 extending from one end at which the out pipe opening 101 is formed to a predetermined width, a tool support portion 120 extending from the other end at which the inner pipe opening 102 is formed to a predetermined width, and an intermediate portion 130 positioned between the pipe insertion portion 110 and the tool support portion 120.

The pipe insertion portion 110 is formed to have a smaller outer diameter than the intermediate portion 130 to have a stepped shape, so that a relevant mold may be easily separated during forging of the fitting 10.

A first outer round 111 having a predetermined curvature may be formed at one end of the pipe insertion portion 110 at which the out pipe opening 101 is formed. In some examples, a second outer round 131 may be formed at the other end of the pipe insertion portion 110 abutting the intermediate portion 130.

The intermediate portion 130 may be formed to have the same outer diameter over its entire length, and may extend to have the same outer diameter over its entire length. The intermediate portion 130 may be formed to have an outer diameter larger than the outer diameter of the pipe insertion portion 110 and smaller than the outer diameter of the tool support portion 120.

That is, the intermediate portion 130 and the tool support portion 120 may be formed to be stepped, and a third outer round 132 may be formed at the end of the intermediate portion 130 abutting the tool support portion 120. The tool support portion 120 may be formed to have the largest outer diameter in the fitting 10, and the thickness thereof is also formed to be thickest, so that a punch 40 for fastening the out pipe 20 to the fitting 10 may be stably supported.

In some implementations, one end of the tool support portion 120 may define the right end of the fitting 10, and an inner pipe opening 102 into which the inner pipe 30 may be formed at the end of the tool support portion 120, that is, the right side surface of the fitting 10. In some examples, the right side surface of the fitting 10 may be formed in a flat shape, and may be formed such that a grip portion 41 of the punch 40 is supported.

In some examples, when looking at the inner surface of the fitting 10, a fastening portion 140, an inclined portion 150, a pressing portion 160, and a tail portion 170 may be included from the left side of the fitting 10 where an out pipe opening 101 is formed.

When looking at a relationship with the outer surface of the fitting 10, the pipe insertion portion 110 and the fastening portion 140 may correspond to each other, the intermediate portion 130 may correspond to the inclined portion 150 and the pressing portion 160, and the tool support portion 120 may correspond to the tail portion 170. That is, the inner surface and the outer surface of the fitting 10 may be formed to correspond to each other.

In some examples, a separate coating layer may be further formed on the inner surface of the fitting 10 to reduce frictional forces occurring during insertion of the out pipe 20 and the inner pipe 30 and movement of the fitting 10. The coating layer may be formed by applying or a solid or liquid wax on the inner peripheral surface as a friction coefficient stabilizing film. In some examples, plating or painting may be performed on the inner and/or outer surfaces of the fitting 10 to improve corrosion resistance.

The inner surface of the fitting 10 is describe below in more detail. The fastening portion 140 may define a part of the left side including the left end of the fitting 10, and may include a first inner round portion 141, a hook 143, and an expanded pipe receiving portion 144.

The first inner round portion 141 may be formed to be rounded at a predetermined curvature at the left end of the fastening portion 140. The insertion of the out pipe 20 into the out pipe opening 101 may be introduced by the first inner round portion 141.

In some examples, the hook 143 may be formed at an end of the first inner round portion 141. The hook 143 may have a shape protruding toward the hollow interior of the fitting 10, and may be formed to protrude to have a width which is gradually narrower or have a hook-like shape.

In this case, the hook 143 may be formed in such a way that the first inner round portion 141 and the second inner round portion 142 meet each other. The second inner round portion 142 may be formed to be rounded to connect an end of the expanded pipe receiving portion 144 and an end of the first inner round portion 141 and have a predetermined curvature. The second inner round portion 142 may have a greater curvature than the first inner round portion 141 so that the fastening with the out pipe 20 may be more effectively performed. The out pipe opening 101 may be defined by an end of the hook 143 or the first inner round portion 141.

The expanded pipe receiving portion 144 may define a space between an end of the second inner round portion 142 and the inclined portion 150 and may be formed to have a uniform inner diameter. The expanded pipe receiving portion 144 may be formed to be more recessed than the hook 143. Therefore, when the out pipe 20 is expanded while being plastically deformed by the punch 40 inside the fitting 10, the expanded pipe portion 21 of the out pipe 20 may be accommodated to restrict the fitting 10 and the out pipe 20 from being separated from each other.

In some examples, the inclined portion 150 may extend such that the inner diameter thereof is gradually getting narrower toward a crimping portion 160 from the fastening portion 140. Therefore, when the fitting 10 is moved, the fitting 10 may press the outer surface of the out pipe 20 to gradually pressurize the out pipe 20.

The inclined portion 150 may be composed of a first inclined portion 151 and a second inclined portion 152 having different slopes. The first inclined portion 151 may be formed to have a greater slope than the second inclined portion 152 at a position adjacent to the fastening portion 140, and an extending length thereof may be shorter relatively. When the fitting 10 is moved to connect the out pipe 20 and the inner pipe 30, the first inclined portion 151 and the out pipe 20 first come into contact. Therefore, the first inclined portion 151 may be formed to have a greater slope than the second inclined portion 152 to effectively deform the out pipe 20 with strong force during the initial movement of the fitting 10.

The second inclined portion 152 may define a portion between the first inclined portion 151 and the crimping portion 160, and be formed to have a smaller slope than the slope of the first inclined portion 151 to gradually pressurize and deform the out pipe 20 due to the continuous movement of the fitting 10.

In some cases, the inclined portion 150 may have a single slope as needed. In some examples, the inclined portion 150 may include portions having two or more slopes. For example, the inclined portion 150 may have a smaller slope as it gets away from the out pipe opening 101. In some examples, the inclined portion 150 may be formed to have a non-continuous slope capable of pressurizing the out pipe 20 in addition to a continuous slope, and may have various shapes capable of pressurizing the out pipe 20 when the fitting 10 is moved, such as a curved shape or a stepped shape capable of pressurizing the out pipe 20.

The crimping portion 160 is a portion forming between the tail portion 170 and an end of the inclined portion 150, and may be formed to have a uniform inner diameter. In some examples, the crimping portion 160 may be a portion having the narrowest inner diameter in the fitting 10 and may be a space where the out pipe 20 and the inner pipe 30 are finally pressurized and connected to each other.

Since the crimping portion 160 is formed to have a predetermined width, the out pipe 20 may be pressurized with the greatest pressure in a corresponding section, thus ensuring the connection between the out pipe 20 and the inner pipe 30 in the corresponding section. The connection length of the out pipe 20 and the inner pipe 30 may be determined according to the length of the crimping portion 160. In some cases, it is also possible to connect the out pipe 20 and the inner pipe 30 only with the inclined portion 150, in which case the crimping portion 160 may be omitted.

In some implementations, pressurization onto the out pipe 20 inside the fitting 10 may be started at the inclined portion 150 and be terminated at the crimp portion 160. That is, the out pipe 20 may be plastically deformed by pressurization in a section which the out pipe 20 passes through the inclined portion 150 and the crimping portion 160, and may be referred to as a pressing portion by including the inclined portion 150 and the crimping portion 160.

The tail portion 170 may include the inner pipe opening 102, a third inner round portion 171, and a fourth inner round portion 172. The tail portion 170 may have a larger inner diameter than the crimping portion 160, and define the opening of the inner pipe 30 into which the inner pipe 30 is inserted.

In some examples, the third inner round portion 171 may be formed at an end of the tail portion 170 abutting the crimping portion 160. The third inner round portion 171 may be formed in a round shape having a predetermined curvature so as to guide the inner pipe 30 to be inserted into the out pipe 20.

Figure 13:
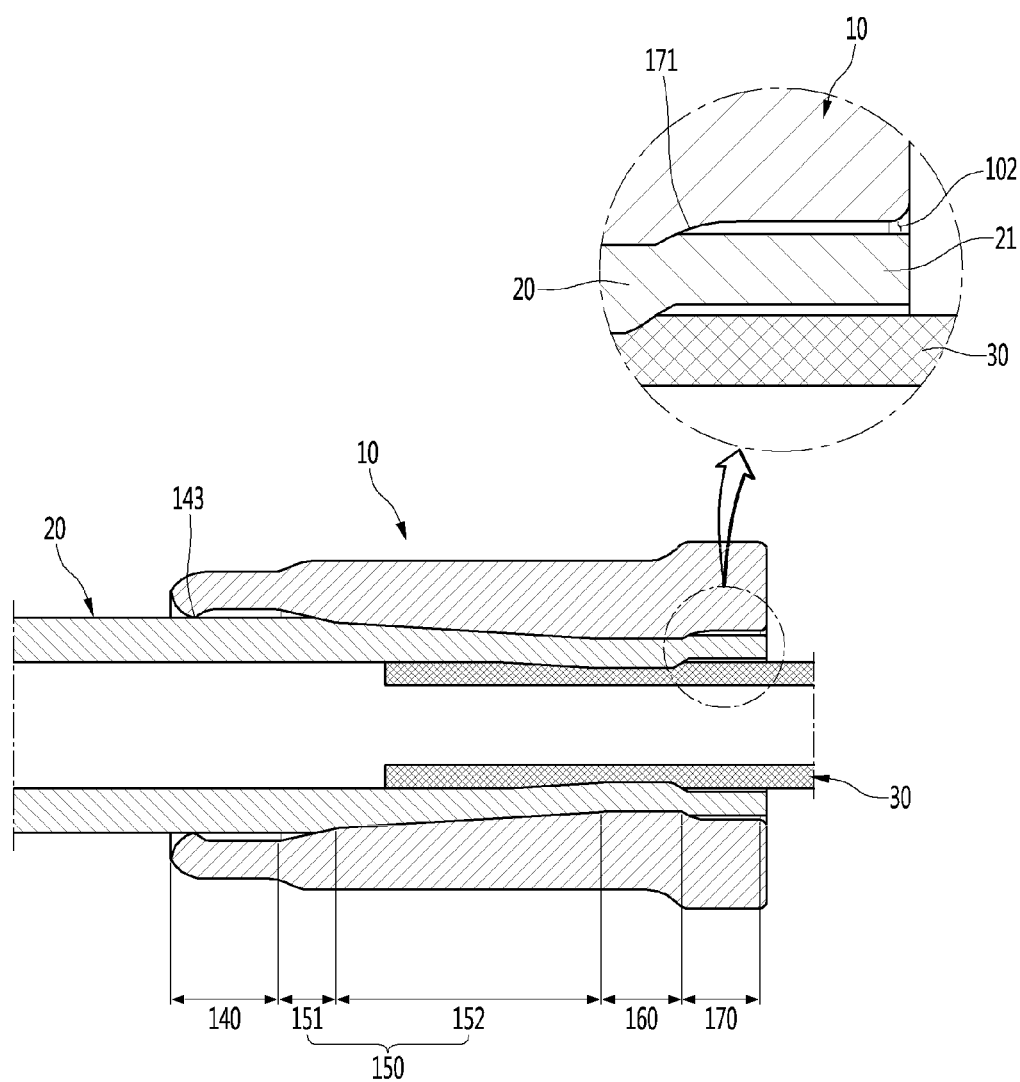
FIG. 13 is a cross-sectional view showing an example state in which the outer pipe and the inner pipe are connected.

The expanded pipe portion 21 of the out pipe 20 which is fixed to be caught with the hook 143 may be constrained by being caught with the third inner round portion 171, that is, the end of the tail portion 170 when the fitting 10 is moved, as shown in FIG. 13. Accordingly, it may be possible to prevent the fitting 10 from moving after the out pipe 20 and the inner pipe 30 are connected by the fitting 10. Therefore, the tail portion 170 may be formed to have an inner diameter capable of accommodation of the expanded pipe portion 21. The third inner round portion 171 may help to prevent the fitting 10 from departing from a fixed position, and thus may be referred to as a breakaway preventing portion 171.

In some examples, the fourth inner round portion 172 may be formed at an end of the tail portion 170 where the inner pipe opening 102 is formed. The fourth inner round portion 172 may guide the inner pipe 30 to be easily inserted into the fitting 10.

In some examples, the shapes of the inner and outer surfaces of the fitting 10 may be formed in a symmetrical shape with respect to the central axis of the fitting 10. Therefore, the fitting 10 may be molded through forging to pressurize material inside the mold, and may be molded more quickly and easily by a simple process.

FIGS. 6A to 6E are views sequentially showing an example of a process for manufacturing a pipe fitting.

Figure 6A:
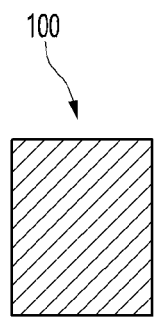
FIGS. 6A to 6E are views sequentially showing an example of a process for manufacturing a pipe fitting.
Figure 6B:
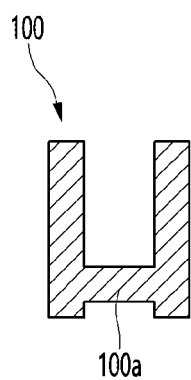
Figure 6C:
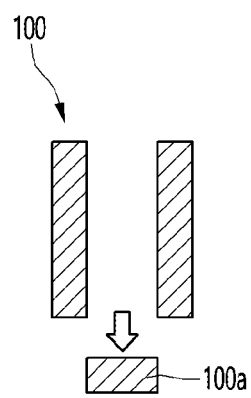
Figure 6D:
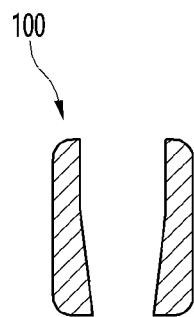
Figure 6E:
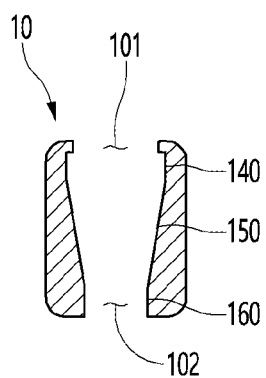

In some implementations, when a raw material 100 for forming the fitting 10 is a wire, a bar or a metal material in a cutting block state, the raw material 100 is cut to a certain length (FIG. 6A). The cut raw material 100 may be formed to have a hollow by extrusion processing. In this case, both ends at which the out pipe opening 101 and the inner pipe opening 102 are formed may be molded respectively, and may be extruded to have different sizes (FIG. 6B). Next, the raw material 100 is subjected to a piercing process to be molded to have a completely penetrating shape by removing a clogged portion 100*a* between the openings at the both ends. Through the piercing process, the raw material 100 may be molded into a shape such as a hollow tube (FIG. 6C). The pierced raw material 100 is processed to have a primary shape for forming the inclined portion 150 and the fastening portion 140 through forging process, and have a rounded shape in the outer surface (FIG. 6D). Finally, the forged raw material 100 is partially and additionally subjected to a reducing process to mold the inner shape of the fastening portion 140 such as the hook 143 and the shape of the tail portion 170 to finish the molding of the fitting 10 (FIG. 6E).

Figure 7A:
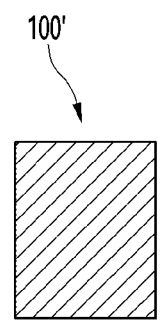
FIGS. 7A to 7C are views sequentially showing another example of a process for manufacturing a pipe fitting.
Figure 7B:
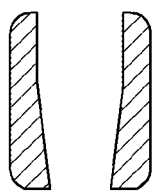
Figure 7C:
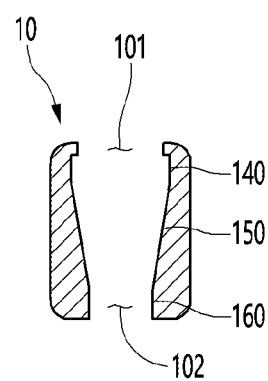

FIGS. 7A to 7C are views sequentially showing another example of a process for manufacturing a pipe fitting.

In some implementations, when a raw material 100 for the fitting is a tube or pipe-shaped metal material, the raw material 100 is first cut to a certain length (FIG. 7A). The cut raw material 100 is processed to have a primary shape for forming the inclined portion 150 and the fastening portion 140 through forging process, and have a rounded shape in the outer surface (FIG. 7B). Finally, the forged raw material 100 is subjected to a reducing process to mold the entire inner shape of the fastening portion 140 such as the hook 143 and the shape of the tail portion 170 to finish the molding of the fitting 10 (FIG. 7C).

As described above, the number of steps is different depending on the state of the raw material 100, but the fitting 10 is not only formed in an axially symmetrical shape with respect to the central axis, but also has a structure in which the internal structure is easily forged, so that it is possible to form the fitting 10 through a forging process performed in multiple steps without further processing.

In some examples, the punch 40 is required in order for the fitting 10 and the out pipe 20 to be first fastened to each other. The out pipe 20 may be primarily fastened to the fitting 10 by using the punch 40 while the out pipe 20 is inserted into the fitting 10. In this case, the fastening of the out pipe 20 and the fitting 10 may be called temporary fixing, line fastening, temporary fastening, or the like, and may be a state in which the fitting 10 is fastened to the extent capable of being distributed and supplied in the state in which the fitting 10 is fastened to the out pipe 20 before a final fixation of the fitting 10, rather than a permanent fixation of the fitting 10.

Figure 8:
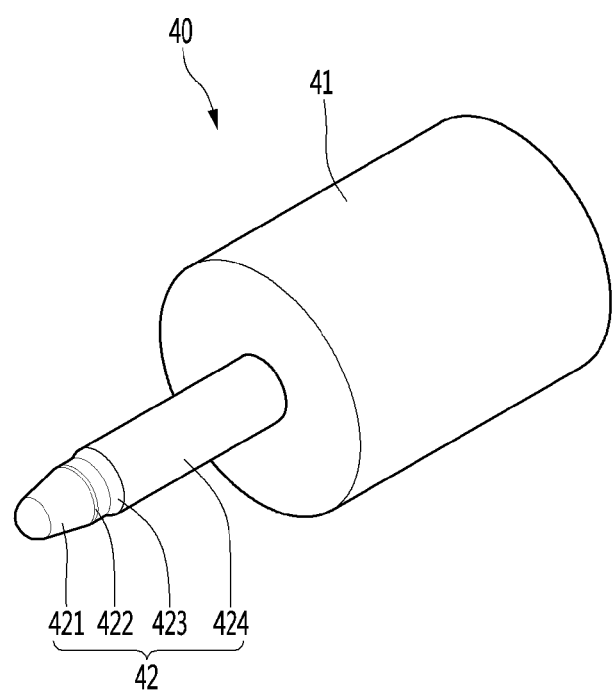
FIG. 8 is a perspective view illustrating an example of a punch for fastening a pipe fitting and an out pipe.

FIG. 8 is a perspective view illustrating an example of a punch for fastening the fitting and the out pipe.

In some implementations, the punch 40 is for fastening the out pipe 20 and the fitting 10 and is formed to be inserted from the right end of the fitting 10 to expand and mold the out pipe 20 inserted into the fitting.

In detail, the punch 40 may include a grip portion 41 and a punch portion 42 as a whole. The grip portion 41 is a portion abutting one end of the fitting 10 corresponding to the tool support portion 120 and the tail portion 170, and may be formed to be mounted on an additional device (tool) for fixing and using the punch 40. Therefore, the shape of the grip portion 41 may be variously formed according to the type and structure of the device for fixing the punch 40.

The punch portion 42 is to expand the out pipe 20 to allow the out pipe 20 and the fitting 10 to be substantially fastened to each other and may be located in the center of the grip portion 41 and be formed to have a sufficient length to pass through the fitting 10. The punch portion 42 may include a front end portion 421, a first straight portion 422, a punch pressing portion 423, and a second straight portion 424. The front end portion 421 may define an extended end of the punch portion 42, and may be formed to have an inclined periphery such that an outer diameter decreases toward an extension direction. Accordingly, the punch 40 may be formed to be sequentially inserted into the inner pipe opening 102 and the opened one end of the out pipe.

In some examples, the first straight portion 422 connects between the front end portion 421 and the punch pressing portion 423, and may be formed to have an outer diameter corresponding to a rear end of the front end portion 421.

The punch pressing portion 423 may be formed to be inclined or rounded to have a gradually larger outer diameter from an end of the first straight portion 422, the out pipe 20 is expanded and actually fastened inside of the fastening portion 140. To this end, the pressing portion may be formed to be inclined or rounded to have a larger outer diameter from the inside to the outside of the out pipe 20.

The second straight portion 424 extending at the uniform outer diameter to the grip portion 41 may be formed at a rear end of the punch pressing portion 423. In this case, the outer diameter of the second straight portion 424 is formed larger than those of the front end portion 421, the punch pressing portion 423, and the first straight portion 422, and may be formed to have the largest outer diameter of the punch portion 42. In some examples, the outer diameter of the second straight portion 424 may be formed to have a smaller outer diameter than the inner diameter of the narrowest portion of the punch 40 so as to be inserted into and pass through the fitting 10.

Figure 9:
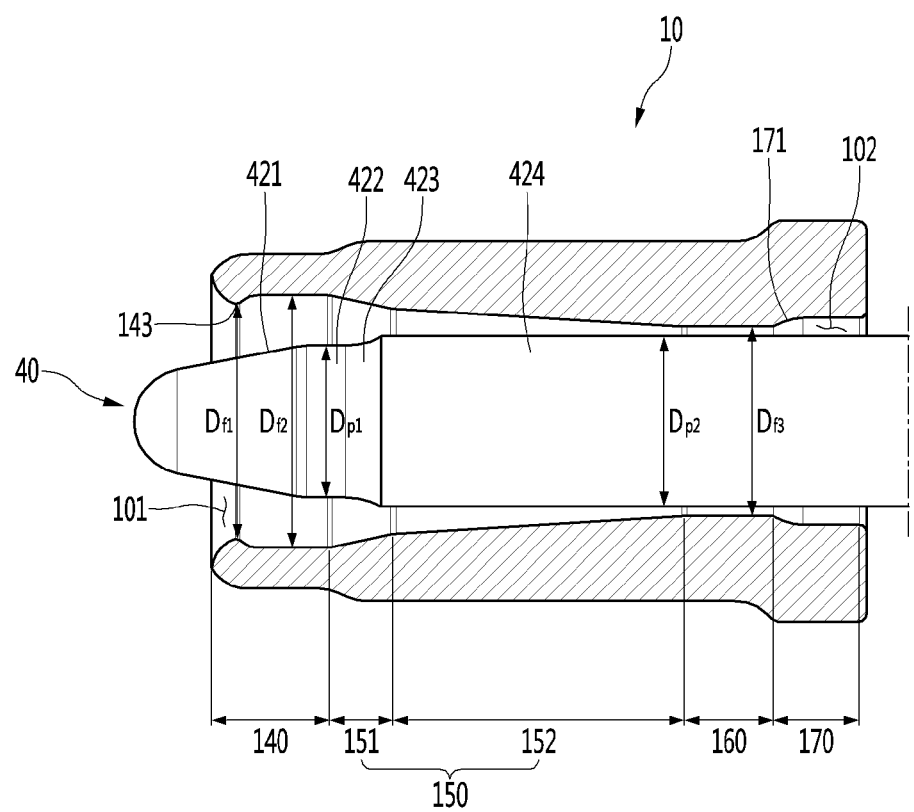
FIG. 9 is a view illustrating inner and outer diameters of an example pipe fitting and an example punch.
Figure 10:
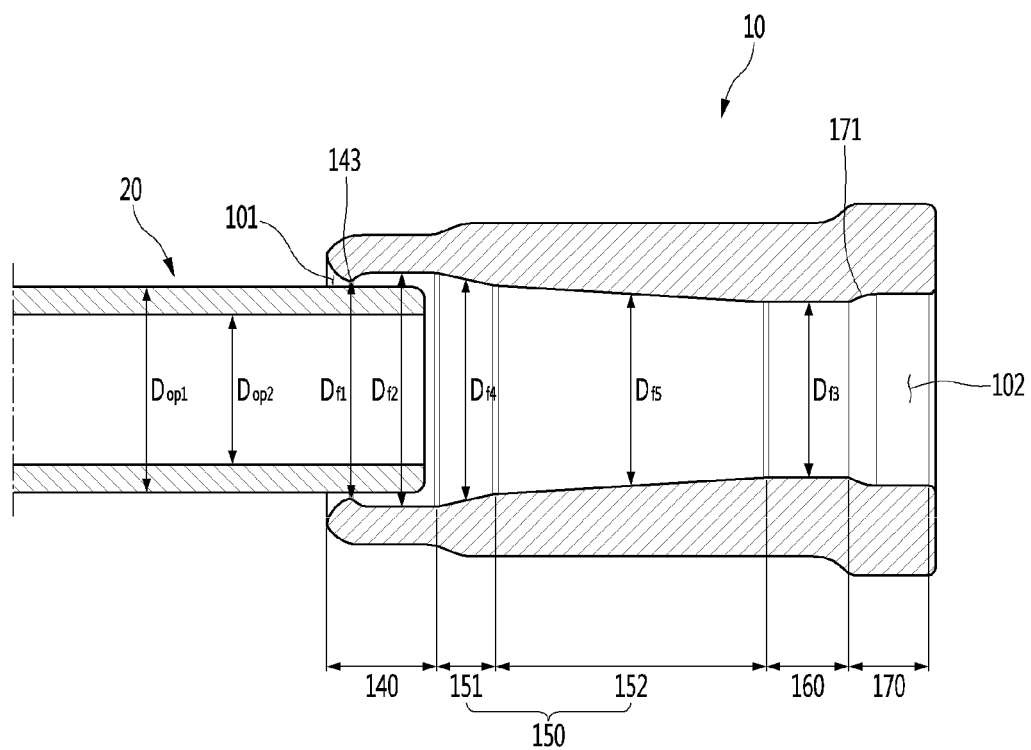
FIG. 10 is a view illustrating inner and outer diameters of an example out pipe inserted into an example pipe fitting.
Figure 11:
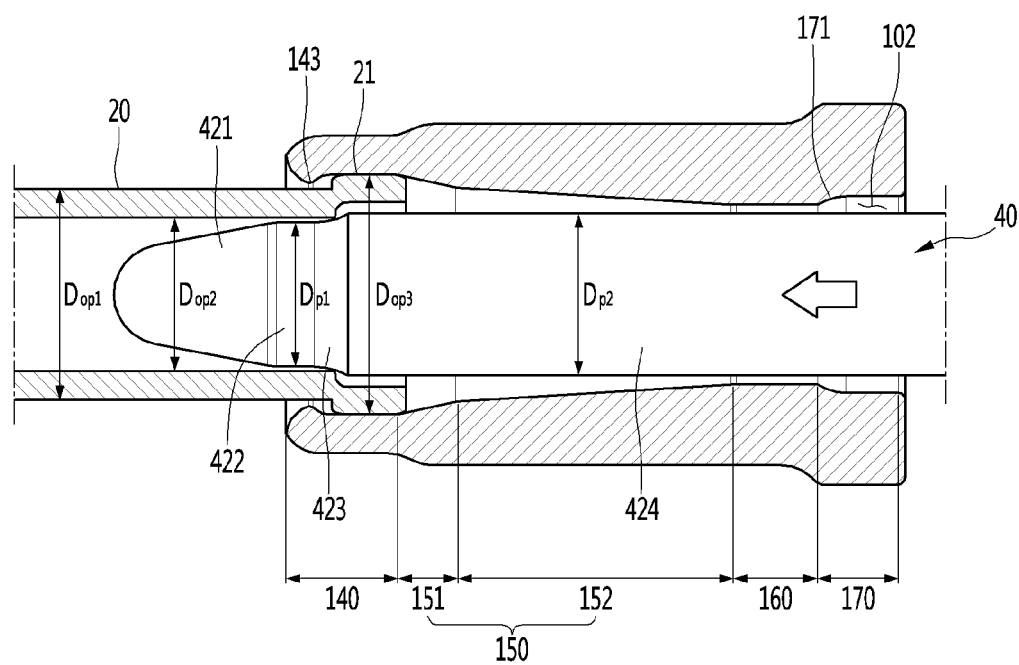
FIG. 11 is a view illustrating outer diameters of an example out pipe fastened to an example pipe fitting.

FIG. 9 is a view illustrating inner and outer diameters of an example pipe fitting and an example punch. FIG. 10 is a view illustrating inner and outer diameters of the out pipe inserted into the fitting. FIG. 11 is a view illustrating outer diameters of the out pipe fastened to the fitting.

In some implementations, in order for the out pipe 20 to be inserted into the fitting 10, expanded by the punch 40, and fastened to the fitting 10, the the out pipe 20, the fitting 10, and the punch 40 may have a set dimensional relationship.

For example, the narrowest portion of the fitting 10 may correspond to the inner diameter (Df3) of the crimping portion 160, and may be formed larger than the largest outer diameter (Dp2) of the punch portion 42, that is, the outer diameter (Dp2) of the second straight portion 424 to enable insertion of the punch portion 42. Therefore, the punch 40 may be inserted into the fitting 10 through the inner pipe opening 102 and pass through the fitting 10.

In some examples, the inner diameter (Df1) of the out pipe opening 101 is formed to be equal to or slightly larger than the outer diameter (Dop1) of the out pipe 20, and the out pipe 20 may be inserted into the fitting 10 through the out pipe opening 101. In this case, the protruding end of the hook 143 may be in contact with or close to the outer peripheral surface of the out pipe 20.

In some examples, the outer diameter (Dop1) of the out pipe 20 may be formed smaller than the inner diameters (Df3, Df4, and Df5) of the crimping portion 160, the first inclined portion 151 and the second inclined portion 152 inside the fitting 10. In some examples, although the inner diameter (Df4) of the first inclined portion 151 is formed to be largest among them, the inner diameter (Df4) of the first inclined portion 151 may be formed smaller than the outer diameter of the out pipe 20.

Therefore, when the out pipe 20 is inserted for primary fastening, the out pipe 20 may be inserted up to the inlet area of the first inclined portion 151, and the end of the out pipe 20 may be located in the inner region of the expanded pipe receiving portion 144.

Furthermore, the inner diameter (Dop2) of the out pipe 20 may be formed larger than the outer diameter (Dp1) of the first straight portion 422 of the punch 40, and be formed smaller than the outer diameter (Dp2) of the second straight portion 424. That is, when inserting the punch 40, the front end portion 421 and the first straight portion 422 may be inserted into the interior of the out pipe 20, and the end of the out pipe 20 may be expanded by the punch pressing portion 423.

In detail, as shown in FIG. 11, when the punch 40 is inserted into the fitting 10 in a state in which the out pipe 20 is inserted into the fitting 10, an end of the punch 40, that is, the front end portion 421 and the first straight portion 422 are inserted into the out pipe 20 and the punch pressing portion 423 may expand the out pipe 20 toward the outside while contacting the inner surface of the out pipe 20.

In this case, the end of the out pipe 20 is located in the inside of the expanded pipe receiving portion 144. In some examples, the inner diameter (Df2) of the expanded pipe receiving portion 144 may be larger than the inner diameter of the hook 143, that is, the inner diameter (Df1) of the out pipe opening 101 and thus, the end of the out pipe 20 may be further expanded inside the expanded pipe receiving portion 144 to form an expanded pipe portion 21. The expanded end of the out pipe 20, that is, the outer diameter (Dop3) of the expanded pipe portion 21 may be formed larger than the outer diameter (Dop1) of the out pipe 20, and may correspond to the inner diameter (Df2) of the expanded pipe receiving portion 144. Therefore, the end of the out pipe 20 is press-fixed to the hook 143 inside the fastening portion 140 of the fitting 10, and is accommodated in the expanded pipe receiving portion 144 to be fastened to the fitting 10.

Hereinafter, a process of connecting the out pipe 20 and the inner pipe 30 having the above-described structure will be described with reference to the drawings.

Figure 12A:
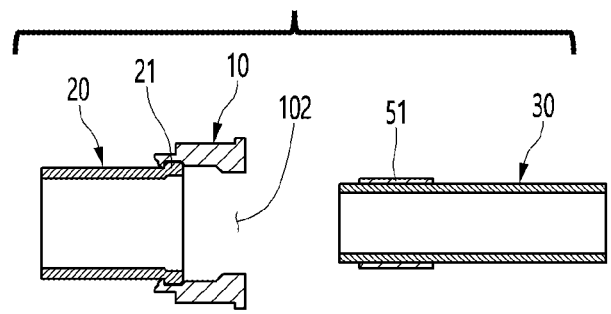
FIGS. 12A to 12C are views sequentially showing an example process of connecting an out pipe and an inner pipe.
Figure 12B:
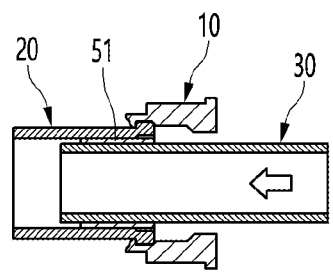
Figure 12C:
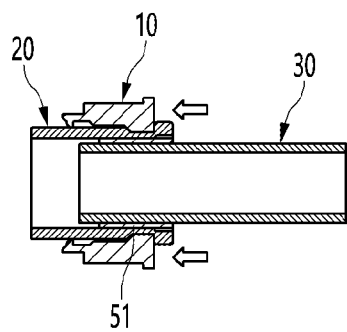

FIGS. 12A to 12C sequentially show an example process of connecting the out pipe and the inner pipe. FIG. 13 is a cross-sectional view showing an example state in which the outer pipe and the inner pipe are connected.

In some implementations, the fitting 10 is supplied in a state of being fastened to the out pipe 20. In some examples, the fastening of the fitting 10 and the out pipe 20 may be in a temporary fastening state, where the fitting 10 is connected to the extent that the fitting 10 may be separated from the out pipe 20 in other work such as transportation or processing before the connecting operation of the out pipe 20 and the inner pipe 30, and when the fitting 10 is moved due to force applied to the fitting 10, the fitting 10 may be moved to the extent that the fitting 10 is moved to the left (when referring to FIGS. 12A to 12C) while deforming the out pipe 20.

That is, during the operation for connecting the out pipe 20 and the inner pipe 30, the out pipe 20 is temporarily fastened to the fitting 10 for operation of expanding the end of the out pipe 20. In this state, the fitting 10 and the out pipe 20 is provided to a worker, and the worker may simply connect the out pipe 20 and the inner pipe 30 by inserting the inner pipe 30 and manipulating the fitting 10.

In some examples, the out pipe 20 may be a part of the refrigerant pipe constituting the refrigeration cycle, and if necessary, the out pipe 20 is connected to the refrigerant pipe to be a part of components constituting the refrigeration cycle. For example, a portion with a tube shape, provided in all configurations capable of being connected to a refrigerant pipe, such as a compressor, a condenser, an evaporator, a capillary tube, a dryer, and an expansion device connected to the refrigerant pipe, may be referred to as the out pipe 20.

The out pipe 20 may be provided to a worker in a state of being fastened to the fitting 10, and the inner pipe 30 for connection with the out pipe 20 may be provided to an assembly worker. In this case, a sealing member 51 may be provided on a portion of the outer surface of the inner pipe 30 inserted into the out pipe 20.

The sealing member 51 may enable a hermetical seal between the inner surface of the out pipe 20 and the inner pipe 30, and enhance the hermetical seal between the out pipe 20 and the inner pipe 30 even when the inner pipe 30 and/or the inner pipe 30 is plastically deformed due to pressurization by the fitting 10

The sealing member 51 may be formed of a liquid form that may be coated on the inner pipe 30, or may be formed of a material that may be cured after application or in a structure that is mounted after being separately molded. For example, the sealing member 51 may be variously adopted among a polymer coating or painting, such as urethane, rubber, polytetrafluoroethylene (PTFE), plastic, or a pressure-foaming sealing adhesive thermal fastening retaining member, a sealing tape, or the like. In some cases, if the sealing member 51 is not required, the sealing member 51 may be omitted.

The sealing member 51 may be provided in a state of already applied or attached to the inner pipe 30 before the connection of the out pipe 20 and the inner pipe 30. That is, the worker may be provided with the inner pipe 30 provided with the sealing member 51 and the out pipe 20 to which the fitting 10 is fastened. In particular, since the sealing member 51 may be provided on the inner pipe 30 regardless of whether or not the fitting 10 is fastened, the sealing member 51 may be provided in a state of being uniformly formed on the inner pipe 30 by an automated device or mechanism before connecting the out pipe 20 and the inner pipe 30 (FIG. 12A). In some examples, the process described above may be referred to as an assembly preparation step.

Next, the worker inserts the inner pipe 30 into the inner pipe opening 102 of the fitting 10. In this case, the out pipe 20 is fastened to the fitting 10, and the inner pipe 30 may be inserted into the out pipe 20 through the fitting 10. The inner pipe 30 may be inserted until the sealing member 51 is positioned inside the out pipe 20, and the out pipe 20 and the inner pipe 30 are hermetically sealed with each other by the sealing member 51.

Even when the inner pipe 30 is completely inserted into the inside of the out pipe 20, the fitting 10 is temporarily fastened, that is, maintains the same state as that of the assembly preparation step (FIG. 12B). In some examples, the process described above may be referred to as a pipe inserting step.

In the state in which the inner pipe 30 is inserted by a predetermined depth, the user moves the fitting to the left, that is, in the direction in which the out pipe 20 is inserted. Due to the movement of the fitting 10, the outer surface of the out pipe 20 passes through the fastening portion 140, the inclined portion 150, and the pressing portion 160 in turn, and in the process, the out pipe 20 may be plastically deformed by being pressed by the inner surface of the fitting, and be brought into closer contact with the inner pipe 30 (FIG. 12C). In some examples, the process described above may be referred to as fitting pressing step.

In detail, when the fitting 10 is moved in the direction in which the out pipe 20 is inserted, the end of the out pipe 20 is pressurized while first contacting the first inclined portion 151 and is then plastically deformed such that the outer diameter thereof is reduced. When the fitting 10 is further moved, the end of the out pipe 20 is gradually more pressurized after passing through the second inclined portion 152, and accordingly, the outer diameter of the out pipe 20 is also gradually more reduced. The outer diameter of the out pipe 20 is narrowed to the maximum at a point where the out pipe 20 passes through the crimping portion 160 and the out pipe 20 may be maximally in close contact with the inner pipe 30. In this case, the inner pipe 30 may also be partially pressurized and deformed such that the outer diameter thereof is narrowed as the out pipe 20 is pressurized and deformed. The out pipe 20 and the inner pipe 30 may be in a maximum pressurized state at the crimping portion 160 of the fitting 10, and may be connected to the inner pipe 30 in a state of being in completely contact with the inner pipe 30.

A lot of force is required when the worker moves the fitting 10 by hand, and accordingly, the worker may move the fitting 10 more easily by using a tool for fastening. In this case, by using a stepped portion between the intermediate portion 130 and the tool support portion 120 of the fitting 10, the worker may more easily move the fitting 10 by allowing the device or tool for fastening to be caught with uniform force.

In some examples, in a state in which the fitting 10 is moved to the left such that the out pipe 20 and the inner pipe 30 is completely connected to each other, the expanded end of the out pipe 20 is located inside the tail portion 170. In this case, the expanded pipe portion 21 of the out pipe 20 is positioned inside the tail portion 170, and the expanded pipe portion 21 may be naturally fixed to be caught with the breakaway preventing portion 171.

Therefore, even in a situation in which a refrigerant flows and pressure is applied through the out pipe 20 and the inner pipe 30, it may be prevented that the fitting 10 is pushed to the right and falls out. That is, the fitting 10 is constrained in the movement in the right direction by the engagement of the tail portion 170 and the expanded pipe portion 21 so that the movement of the fitting 10 does not occur even in a situation where pressure is applied to maintain the engagement of the out pipe 20 and the inner pipe 30.

In some examples, the fitting may be implemented in various other implementations in addition to the above-described implementation.

Hereinafter, another example structure of the pipe fitting will be described. Among the configurations of other implementations of the present disclosure described below, a description for the same configuration as the above-described implementation will be omitted and the same reference numerals as the above-described implementation are used.

Figure 14:
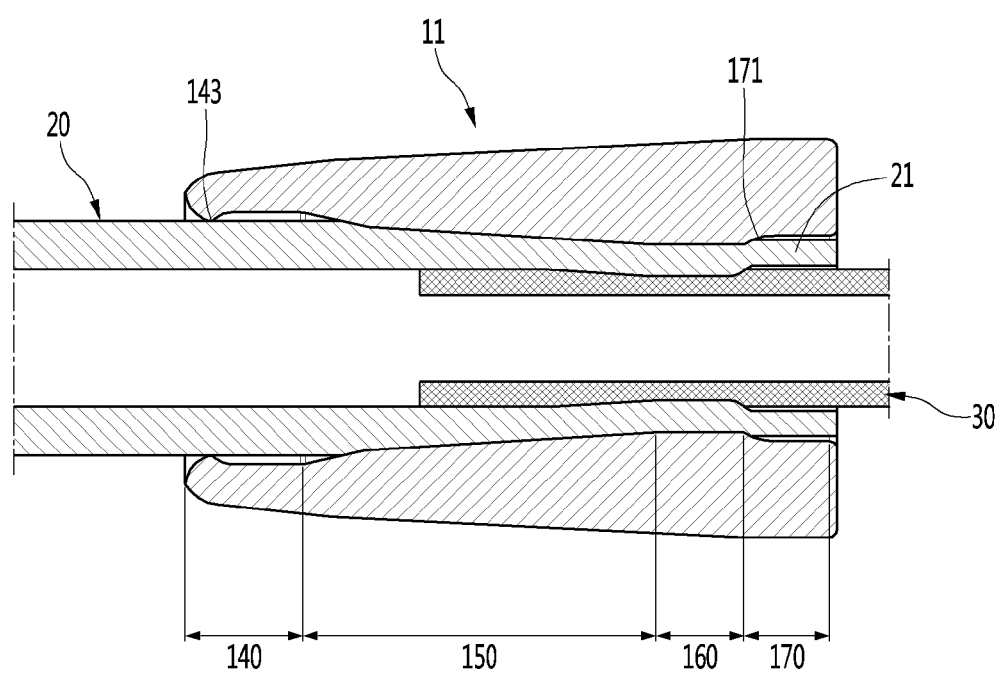
FIG. 14 is a cross-sectional view showing an example state in which an out pipe and an inner pipe are connected by an example pipe fitting.
Figure 15:
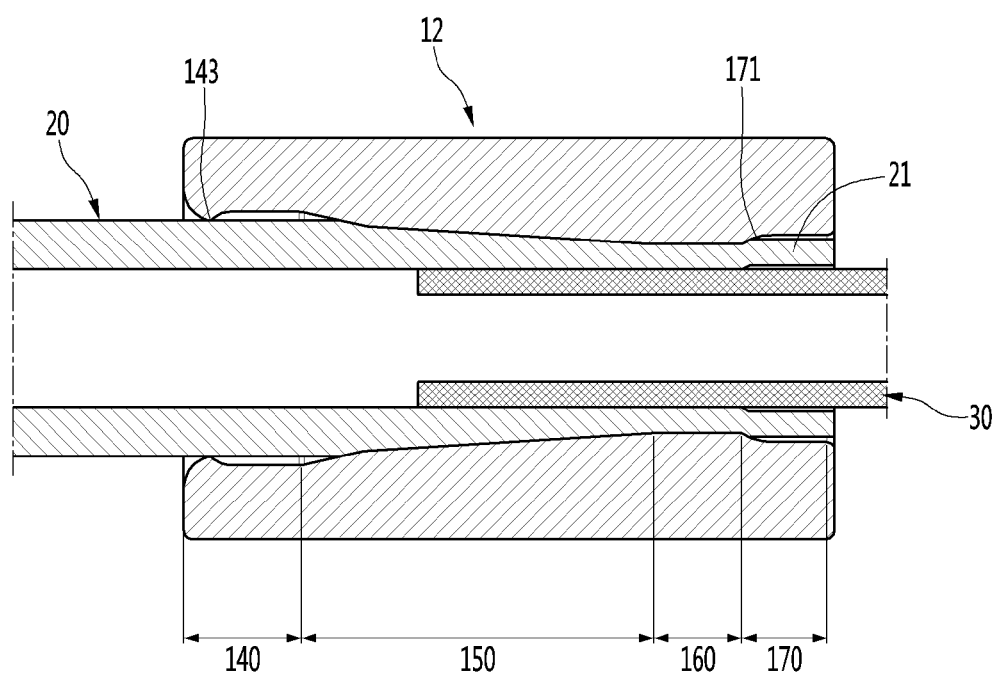
FIG. 15 is a cross-sectional view showing an example state in which an out pipe and an inner pipe are connected by an example pipe fitting.

FIG. 14 is a cross-sectional view showing an example state in which the out pipe and the inner pipe are connected by an example pipe fitting. FIG. 15 is a cross-sectional view showing an example state in which the out pipe and the inner pipe are connected by an example pipe fitting.

As shown in FIG. 14, the fitting 11 may have the same shape as the internal shape of the fitting 11 of the above-described implementation. Therefore, the fastening of the out pipe 20 and the fitting 11 and the connection of the out pipe 20 and the inner pipe 30 may be achieved by the same operation by the same structure.

In some examples, the outer surface of the fitting 11 may be formed to be inclined such that the thickness increases from the front end to the rear end. In some examples, a separate stepped structure may not be provided on the outer surface of the fitting 11. In this case, the right end of the fitting 11, that is, a side into which the inner pipe 30 may be inserted may have a maximum thickness, and when the punch is inserted into the fitting 11, be formed to stably support the grip portion 41 of the punch 40.

A user may identify the insertion directions of the out pipe 20 and the inner pipe 30 and the movement direction of the fitting 10 through a thickness difference between the left end and the right end of the fitting 10 and the slope of the outer surface of the fitting 10.

As shown in FIG. 15, the fitting 11 may have the same shape as the internal shape of the fitting 11 of the above-described implementation. Therefore, the fastening with the out pipe 20 and the connection of the out pipe 20 and the inner pipe 30 may be achieved by the same operation by the same structure as the above-described implementation.

The outer surface of the fitting 12 may form a straight line on the entire surface from the front end to the rear end, and when viewed from the outside, and when is viewed from the outside, the fitting 12 may be formed to have a cylindrical shape having a uniform outer diameter. In some examples, a separate stepped structure is not provided on the outer surface of the fitting 12.

In this case, the thickness of one end of the inner pipe 30 is inserted may be formed to a thickness capable of stably supporting the grip portion 41 when the punch 40 is inserted. Therefore, the entire outer diameter of the fitting 12 may be determined by the surface contacting the grip portion 41. In some examples, the fitting 12 may have an external structure without a hook as a structure in which no bent or stepped portion is formed.

In this way, by simplifying the external structure of the fitting 12, molding may be more easily performed and the appearance may be made cleaner. In some examples, in a state in which the fitting 12 is completely fastened, interference or jamming with other components constituting a pipe or a refrigeration cycle does not occur.

In some examples, the fitting 12 needs to be able to retain a state of being fastened to the out pipe 20, and the fitting 12 needs to be retained at least in a state of being temporarily fixed or first fastened to the out pipe 20 until the inner pipe 30 is inserted.

Hereinafter, various examples of a structure for retaining the fastening structure of the fitting and the out pipe will be described. Among the configurations of the implementations described below, description and illustration for the same configurations as the above-described implementation will be omitted and the same reference numerals as the above-described implementation will be used.

Figure 16:
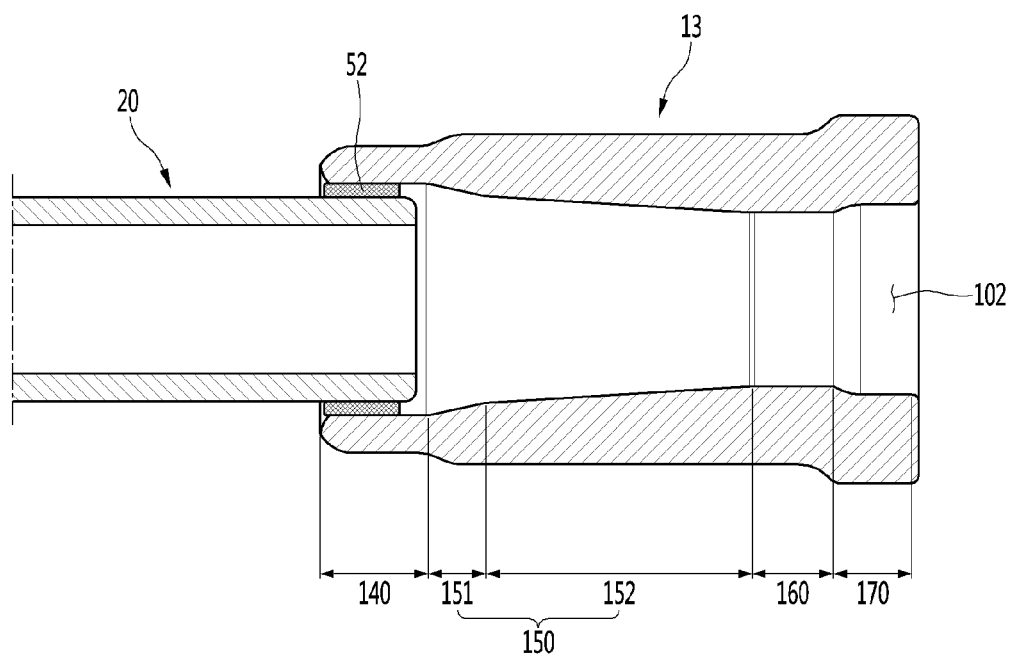
FIG. 16 is a cross-sectional view showing a fastening structure of an example pipe fitting and an example out pipe.

FIG. 16 is a cross-sectional view showing a fastening structure of an example pipe fitting and an example out pipe.

In some implementations, the fitting 13 is formed with the out pipe opening 101 and the inner pipe opening 102 at both sides thereof, and the out pipe 20 may be inserted into the fitting 13 through the out pipe opening 101.

In some examples, the fastening portion 140, the inclined portion 150, the crimping portion 160, and the tail portion 170 are formed inside the fitting 13 to provide a structure in which the out pipe 20 and the inner pipe 30 are press-connected to each other in the fitting 13. In some examples, the inner diameter of the fastening portion 140 may be formed to correspond to a shape corresponding to the outer diameter of the out pipe 20, and the fastening portion 140 may be in contact with or adjacent to the outer diameter of the out pipe 20.

In some examples, the fastening portion 140 in the fitting 13 may have a structure in which the hook 143 is not formed, unlike in the above-described implementation. In some examples, the end of the out pipe 20 may be inserted into the fastening portion 140, and in this case, an adhesive 52 may be coated on the outer peripheral surface of the out pipe 20. The adhesive 52 may provide an adhesive force that is strong to retain the outer surface of the out pipe 20 and the inner surface of the fitting 13 to be adhered to each other.

In some examples, after the inner pipe 30 is inserted into the fitting 13 and the out pipe 20, the fitting 13 may be moved to pressurize and plastically deform the out pipe 20, so that the out pipe 20 and the inner pipe 30 may be connected to each other.

That is, the adhesive 52 may maintain a temporary fixing or temporary adhesion state only until the inner pipe 30 is inserted, and has an adhesive force enough for the fitting 12 to be moved when a force is applied to the fitting 13 after the inner pipe 30 is inserted. The out pipe 20 and the inner pipe 30 may be completely fastened by the movement of the fitting 13.

Figure 17:
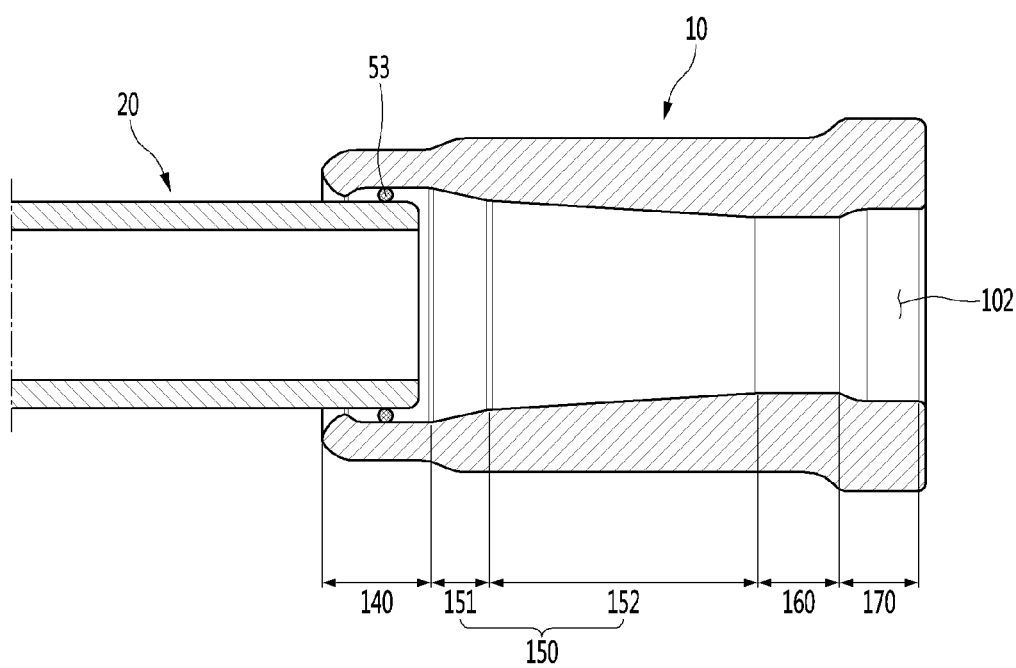
FIG. 17 is a cross-sectional view showing a fastening structure of an example fitting and an example out pipe.

FIG. 17 is a cross-sectional view showing a fastening structure of an example pipe fitting and an example out pipe.

As shown in FIG. 17, the fitting 13 is formed with the out pipe opening 101 and the inner pipe opening 102 at both sides thereof, and the out pipe 20 may be inserted into the fitting 13 through the out pipe opening 101.

In some examples, the fastening portion 140, the inclined portion 150, the crimping portion 160, and the tail portion 170 are formed inside the fitting 10 to provide a structure in which the out pipe 20 and the inner pipe 30 are press-connected to each other in the fitting 10. In some examples, the inner diameter of the fastening portion 140 may be formed to correspond to a shape corresponding to the outer diameter of the out pipe 20, and the fastening portion 140 may be in contact with or adjacent to the outer diameter of the out pipe 20.

In some examples, the fastening portion 140 in the fitting 13 may have a structure in which the hook 143 is not formed. In some examples, a fastening member 53 may be provided at an end of the out pipe 20 or inside the fastening portion 140. The fastening member 53 is interposed between the outer surface of the out pipe 20 and the inner surface of the fitting 10 so that the out pipe 20 and the fitting 10 may be maintained in a state of temporarily fastened to each other.

The fastening member 53 may be made of rubber, plastic, or fiber-made packing or O-ring, or may be formed of an adhesive material such as double-sided tape.

Therefore, the fitting 10 is not easily separated from the out pipe 20 by the frictional force or the adhesive force provided by the fastening member 53, and therefore, the out pipe 20 may be temporarily maintained in a state of being fastened to the fitting 10 even in transportation and processing for assembly.

In some examples, after the inner pipe 30 is inserted into the fitting 10 and the out pipe 20, the fitting 10 is movable. That is, when the fitting 10 is moved by applying a force to the fitting 10, the force overcomes the frictional force or adhesive force of the fastening member 53 to enable the movement of the fitting 10. In some examples, the out pipe 20 and the inner pipe 30 may be completely fastened by the movement of the fitting 13.

Figure 18:
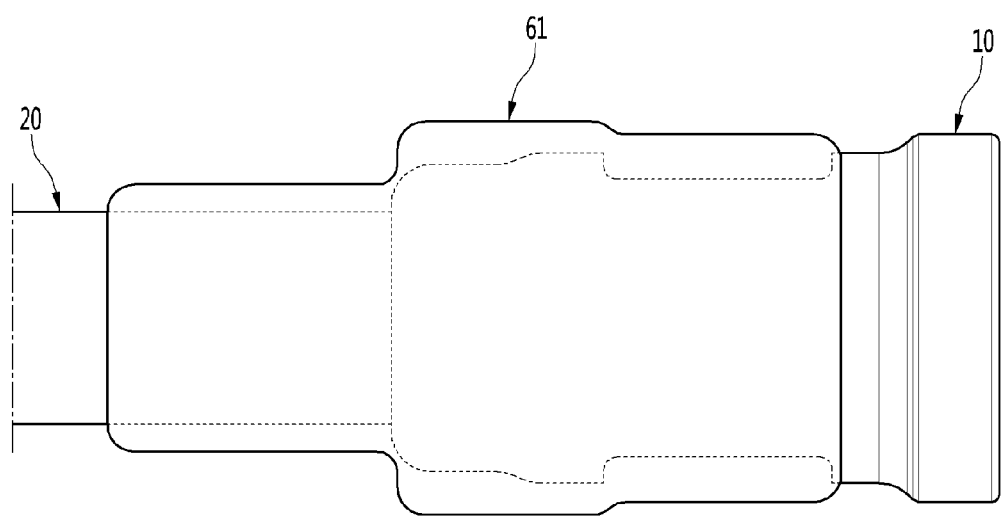
FIG. 18 is a view showing a state in which an example fitting and an example out pipe are maintained to be fastened to each other by an example fastening retaining member.

FIG. 18 is a view showing an example state in which an example pipe fitting and an example out pipe are maintained to be fastened to each other by an example fastening retaining member.

As shown in the figure, the out pipe 20 may be inserted into the fitting 10, and the internal structure of the fitting 10 may be the same as at least one of the above-described implementations.

In some examples, an outer groove 133 recessed inward may be formed along the periphery of the fitting 10 in an outer side of the fitting 10. The outer groove 133 may be formed in one region between the intermediate portion of the fitting 10 or both ends of the fitting 10.

In some examples, the out pipe 20 may be able to maintain a state in which the out pipe 20 is fastened to the fitting 10 by the fastening retaining member 61 in a state of being inserted into one side of the fitting 10. The fastening retaining member 61 is formed in a tube shape having elasticity, and may be formed of a material such as rubber, silicone, or synthetic resin. The fastening retaining member 61 may also be called a shrink tube.

The fastening retaining member 61 may wrap and fix a part of the out pipe 20 to the outer groove 133 of the fitting 10. That is, it is possible to tightly wrap and constrain the out pipe 20 and a part of the fitting 10 into which the out pipe 20 is inserted.

In some cases, the fitting 10 and the out pipe 20 may be in a temporarily fixed state, and the inner pipe 30 may be inserted into the fitting 10 and the out pipe 20 through the inner pipe opening 102 of the other end of the fitting not wrapped by the fastening retaining member 61.

Then, the fitting 10 is in a movable state by removing the fastening retaining member 61, and then the fitting 10 is moved to the out pipe 20 side to pressurize and deform the out pipe 20, thus the out pipe 20 and the inner pipe 30 being completely fastened to each other.

Figure 19:
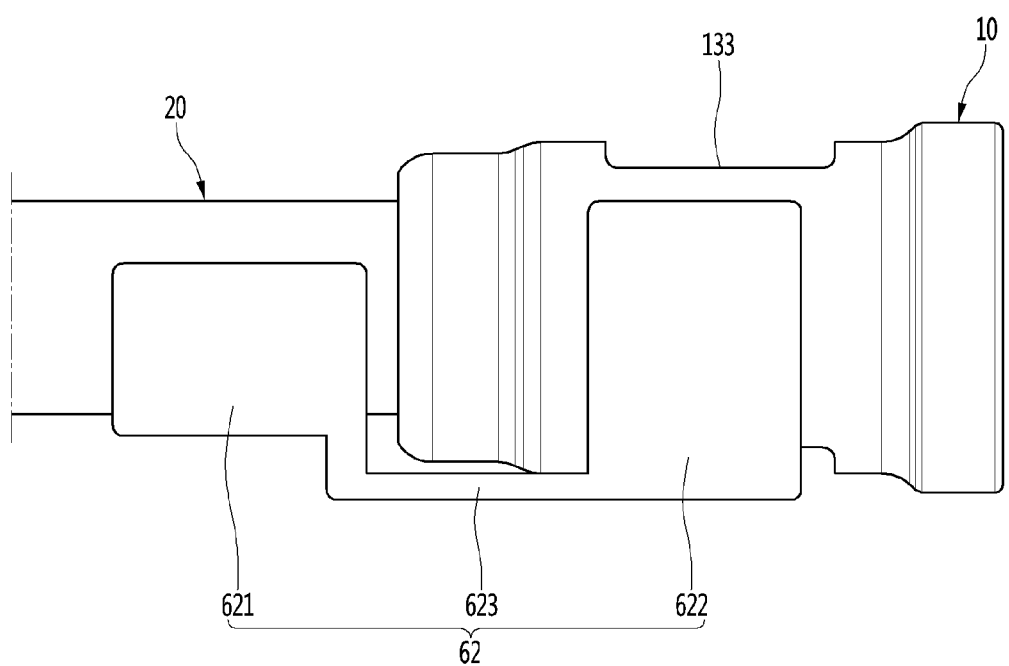
FIG. 19 is a view showing a state in which an example fitting and an example out pipe are maintained to be fastened to each other by another example fastening retaining member.

FIG. 19 is a view showing a state in which an example pipe fitting and an example out pipe are maintained to be fastened to each other by another example fastening retaining member.

In some implementations, the out pipe 20 may be inserted into the fitting 10, and the internal structure of the fitting 10 may be the same as at least one of the above-described implementations.

In some examples, an outer groove 133 recessed inward may be formed along the periphery of the fitting 10 in an outer side of the fitting 10. The outer groove 133 may be formed in one region between the intermediate portion 130 of the fitting 10 or both ends of the fitting 10.

In some examples, the out pipe 20 may be able to maintain a state in which the out pipe 20 is fastened to the fitting 10 by the fastening retaining member 62 in a state of being inserted into one side of the fitting 10. The fastening retaining member 62 may be formed of a plastic or a metal material, and the fitting 10 and the out pipe 20 may be fastened to maintain a fixed state.

In detail, the fastening retaining member 62 may be formed of a metal or plastic material having elasticity, and may be formed to wrap and fix the out pipe 20 and a part of the outer surface of the fitting 10 by elastic deformation.

The fastening retaining member 62 may include a fitting fixing portion 622 inserted into the outer groove 133 to wrap the fitting 10, a pipe fixing portion 621 configured to wrap the outer portion of the fitting 10, and a fixed connection portion 623 configured to connect the fitting fixing portion 622 and the pipe fixing portion 621.

The fitting fixing portion 622 and the pipe fixing portion 621 may be formed to have a greater curvature than the outer peripheral surfaces of the fitting 10 and the out pipe 20, and thus, the fitting 10 and the out pipe 20 may be press-fixed to the fitting fixing portion 622 and the pipe fixing portion 621. That is, the fitting fixing portion 622 and the pipe fixing portion 621 may maintain a fixedly mounted state to the fitting 10 and the out pipe 20, and are connected to each other by the fixed connection portion 623 to maintain a predetermined interval.

Therefore, the fastening retaining member 62 may allow the out pipe 20 and the fitting 10 into which the out pipe 20 is inserted to maintain a fixed position without being floated to each other. In this state, the out pipe 20 to which the fitting 10 is fixed may be transported and processed for connection of the inner pipe 30 and in this case, the fitting 10 is maintained at the initial fastening position on the out pipe 20 by the fastening retaining member 62.

In some cases, the above state may be in a temporarily fixed state, and the inner pipe 30 may be inserted into the fitting 10 and the out pipe 20 through the inner pipe opening 102 of the fitting 10 in a state in which the fastening retaining member 61 is mounted.

Then, after the fastening retaining member 61 is removed, the fitting 10 is moved to the out pipe 20 side to pressurize and deform the out pipe 20, thus the out pipe 20 and the inner pipe 30 being completely fastened to each other.

In some examples, the connection structure of the out pipe 20 and the inner pipe 30 using the fitting 10 having the above-described structure may be used in various devices in which a refrigeration cycle connected by a refrigerant pipe is used.

Hereinafter, an example in which the connection structure of the out pipe and the inner pipe using the fittings of the above-described implementations is applied in a refrigerator will be described. In some cases, for the sake of understanding and convenience, a refrigerator is merely described below as an example, and may be applicable to all devices requiring pipe connection for the flow of refrigerant, including the refrigerator and an air conditioner.

Figure 20:
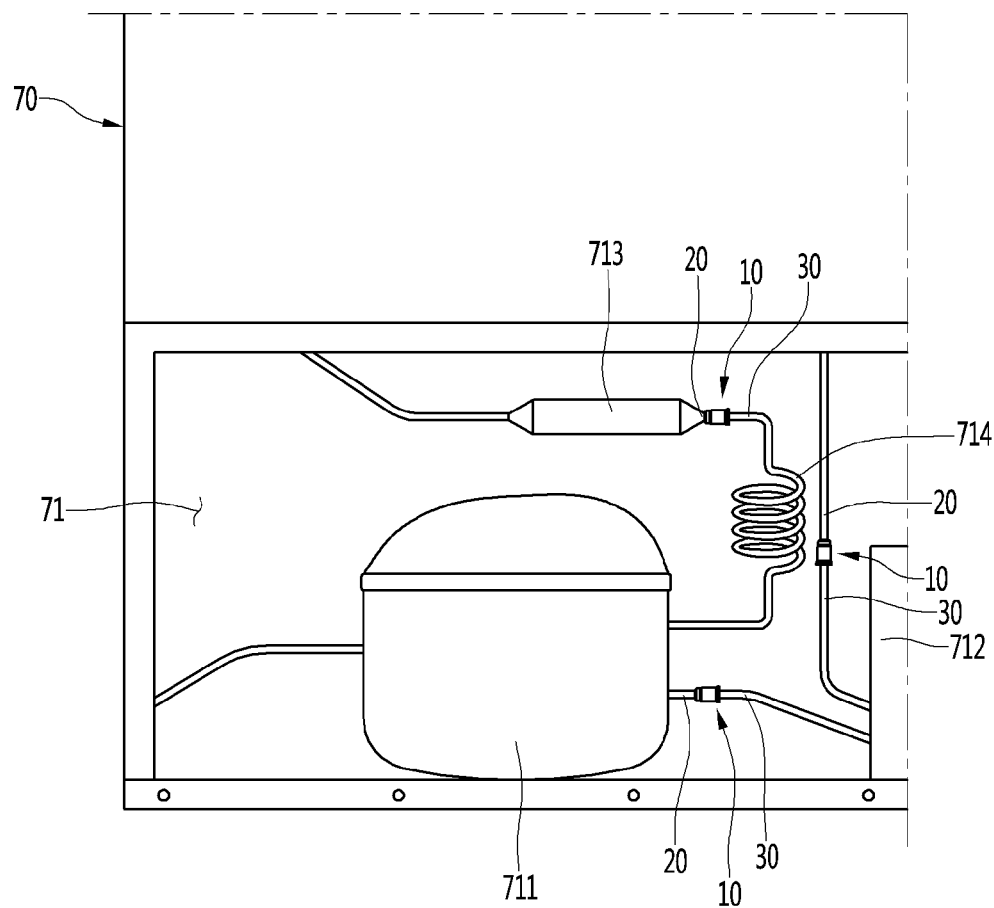
FIG. 20 is a view showing an inside of an example machine room of a refrigerator including an example pipe fitting.

FIG. 20 is a view showing an inside of an example machine room of an example refrigerator including an example pipe fitting.

As shown in the figure, a machine room 71 in which a part of a device constituting a refrigeration cycle including a compressor 711 and a condenser 712 are received may be formed at one side of a cabinet 70 of the refrigerator.

The machine room 71 is a space that is independent of a storage space of the refrigerator and may be formed to communicate with the outside space to enable inflow of outside air. In some examples, the machine room 71 may include the compressor 711 for compressing refrigerant at a high temperature and a high pressure, the condenser 712 for heat exchange of the flowing refrigerant with outside air, a dryer 713 connected to an outlet of the condenser 712 to filter out moisture and foreign substances of the refrigerant, and an expansion device or a capillary tube 714 for expanding cold air supplied to the evaporator 721 to become a low pressure state.

In some examples, the out pipe 20 may be a pipe extending from one side of the compressor 711, a pipe connected to the condenser 712, and a pipe extending from one side of the dryer 713. In some examples, the inner pipe 30 connected to the out pipe 20 may be connected by the fitting 10 as a part of a refrigerant pipe constituting a refrigeration cycle to be connected to the out pipe 20.

That is, in the machine room 71 in which a work space is narrow and many configurations are arranged, configurations such as a modular compressor, a condenser, a capillary tube, a dryer, and the like are mounted in advance and provided to the worker. in a state in which the out pipe 20 is connected to the fitting 10. Then, the worker inserts the inner pipe 30 into the fitting 10 and manipulates the fitting 10 to be moved so that the out pipe 20 and the inner pipe 30 are simply connected.

Figure 21:
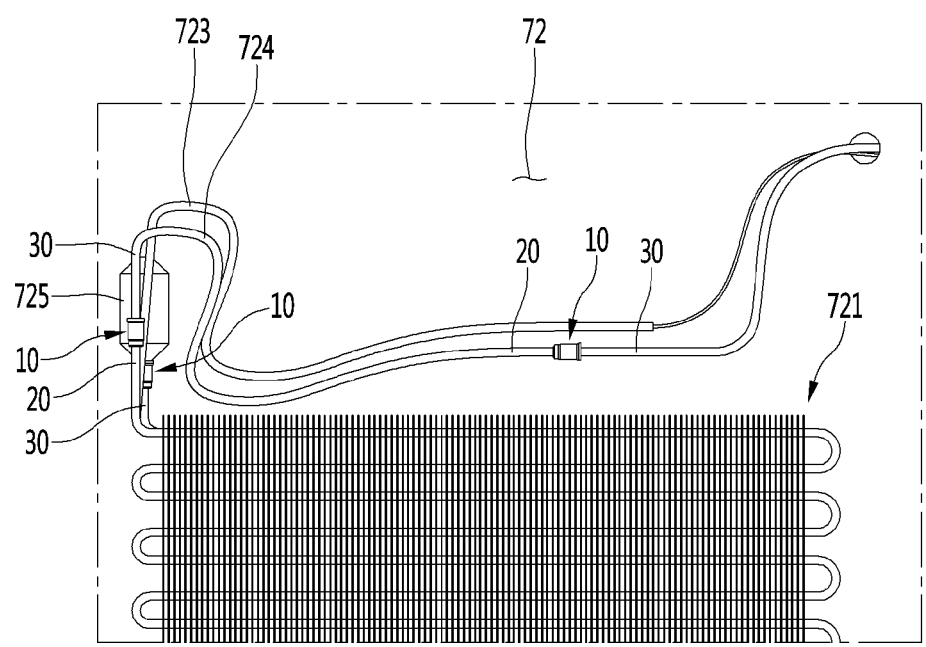
FIG. 21 is a view showing an example of a connection structure between an evaporator and a pipe of a refrigerator including an example pipe fitting.

FIG. 21 is a view showing an example connection structure between an evaporator and a pipe of a refrigerator including an example pipe fitting.

In some implementation, as illustrated in FIG. 21, an evaporator 721 for cooling a storage space 72 may be disposed inside the storage space 72 of the cabinet 70. The evaporator 721 may be provided with an output pipe 724 through which refrigerant is discharged toward the compressor 711 and an input pipe 723 through which refrigerant passing through a capillary tube is introduced. In this case, a part of the input pipe 723 and a part of the output pipe 724 become the out pipes 20 and the fitting 10 may be provided in a temporarily fastened state. In some examples, the evaporator 721 may be connected to an accumulator 725 for separating liquid refrigerant and gas refrigerant from each other, and may be provided in a state in which the fitting 10 is temporarily fastened on a pipe extending from the accumulator 725.

In some implementations, a refrigerant pipe connected to the input pipe 723, the output pipe 724 and the accumulator 725 may correspond to the inner pipe 30. The inner pipe 30 is inserted into the inside of the fitting 10, and the out pipe 20 and the inner pipe 30 may be completely connected due to movement of the fitting 10.

Thus, with the configurations including the out pipe 20 and the out pipe 20 in which the fitting 10 is provided in a temporarily fastened state, a worker performs a simple operation such as inserts the inner pipe 30 and manipulates the fitting 10, thus making it possible to completely fastening and connecting the out pipe 20 and the inner pipe 30.

According to the implementations of the present disclosure, it may be possible to improve the convenience of connection work of pipes, shorten the working time, and significantly improving productivity, thus enhancing industrial applicability

What is claimed is:

1. A refrigerant pipe fitting that is configured to connect to one or more pipes, the refrigerant pipe fitting comprising:
   an out pipe opening defined at a first end of the refrigerant pipe fitting and configured to receive an out pipe;
   an inner pipe opening defined at a second end of the refrigerant pipe fitting and configured to receive an inner pipe that is configured to be inserted into the out pipe disposed inside the refrigerant pipe fitting;
   a pressing portion that defines a part of an inner surface of the refrigerant pipe fitting, the refrigerant pipe fitting having an inner diameter that becomes narrower in a direction from the out pipe opening toward the inner pipe opening and being configured to press and deform the out pipe toward the inner pipe based on moving relative to the out pipe to connect the out pipe with the inner pipe; and a fastening portion defined on the inner surface of the refrigerant pipe fitting between the pressing portion and the out pipe opening, the fastening portion being configured to couple to an end of the out pipe to thereby restrict separation of the out pipe from the refrigerant pipe fitting, wherein the fastening portion comprises:
a hook that protrudes inward and configured to be caught by an expanded pipe portion disposed at the end of the out pipe, and
a receiving portion that defines a recessed space between the hook and the pressing portion and is configured to accommodate the expanded pipe portion of the out pipe, and wherein the refrigerant pipe fitting is configured to, based on the inner pipe being inserted into the out pipe in a state in which the refrigerant pipe fitting is mounted on the out pipe by restraint of the hook and the expanded pipe portion, move along an outer surface of the out pipe to thereby press the outer surface of the out pipe.

2. The refrigerant pipe fitting of claim 1, wherein the inner diameter of the refrigerant pipe fitting at the pressing portion is less than an outer diameter of the out pipe.

3. The refrigerant pipe fitting of claim 1, wherein the inner pipe opening is configured to receive a punch that is configured to form the expanded pipe portion of the out pipe in a state in which the end of the out pipe is located inside the fastening portion.

4. The refrigerant pipe fitting of claim 3, further comprising a tail portion configured to receive the expanded pipe portion of the out pipe and disposed between the pressing portion and the inner pipe opening, the inner diameter of the refrigerant pipe fitting at the tail portion being larger than the inner diameter of the refrigerant pipe fitting at the pressing portion.

5. The refrigerant pipe fitting of claim 4, further comprising:
a breakaway preventing portion that is stepped or rounded from the inner surface of the refrigerant pipe fitting and disposed between the pressing portion and the tail portion, the breakaway preventing portion being configured to contact the outer surface of the out pipe to thereby restrict one-directional movement of the refrigerant pipe fitting.

6. The refrigerant pipe fitting of claim 4, wherein an end of the tail portion is configured to face and support the punch, the end of the tail portion defining a maximum thickness of the refrigerant pipe fitting among an entire portion of the refrigerant pipe fitting.

7. The refrigerant pipe fitting of claim 1, wherein the refrigerant pipe fitting is axially symmetric with respect to an axis extending in the direction from the out pipe opening toward the inner pipe opening.

8. The refrigerant pipe fitting of claim 1, wherein the inner diameter of the refrigerant pipe fitting at the fastening portion is larger than each of an outer diameter of the out pipe and the inner diameter of the refrigerant pipe fitting at the pressing portion, and
wherein the fastening portion is configured to couple to an adhesive applied between the outer surface of the out pipe and an inner surface of the fastening portion.

9. The refrigerant pipe fitting of claim 1, wherein the inner diameter of the refrigerant pipe fitting at the fastening portion is larger than each of an outer diameter of the out pipe and the inner diameter of the refrigerant pipe fitting at the pressing portion, and
wherein the fastening portion is configured to couple to a fastening member that is disposed between the outer surface of the out pipe and an inner surface of the fastening portion, the fastening member being configured to contact the out pipe and the fastening portion.

10. The refrigerant pipe fitting of claim 1, further comprising:
a fastening retaining member configured to contact an outer circumferential surface of the refrigerant pipe fitting and to maintain a state in which the out pipe is inserted into the out pipe opening and fastened to the refrigerant pipe fitting.

11. The refrigerant pipe fitting of claim 10, wherein the fastening retaining member comprises a tube that has elasticity and is configured to surround each of a part of the refrigerant pipe fitting and a part of the out pipe inserted into the refrigerant pipe fitting, the inner pipe opening being configured to be disposed outside the tube.

12. The refrigerant pipe fitting of claim 10, further comprising:
an outer groove recessed from an outer peripheral surface of the refrigerant pipe fitting, wherein the fastening retaining member comprises:
a pipe fixing portion configured to couple to the out pipe,
a fitting fixing portion configured to couple to the outer groove, and
a fixing portion connecting portion that connects the pipe fixing portion to the fitting fixing portion and is configured to receive a stepped boundary between the out pipe and the refrigerant pipe fitting.

13. The refrigerant pipe fitting of claim 1, wherein the pressing portion comprises a plurality of inclined portions that are arranged along an axis extending from the out pipe opening toward the inner pipe opening and have a plurality of slopes with respect to the axis, and
wherein the plurality of slopes decrease from the out pipe opening toward the inner pipe opening.

14. The refrigerant pipe fitting of claim 1, further comprising a crimping portion that is disposed at an end of the pressing portion facing the inner pipe opening and defines a minimum inner diameter of the refrigerant pipe fitting, the crimping portion being configured to fasten the out pipe and the inner pipe to each other.

15. The refrigerant pipe fitting of claim 1, wherein the refrigerant pipe fitting is configured to connect refrigerant pipes to each other, the refrigerant pipes being configured to guide refrigerant through a refrigeration cycle of a refrigerator.

16. The refrigerant pipe fitting of claim 15, wherein the refrigerant pipe fitting is configured to be fastened to the out pipe, the out pipe being a part of at least one of a compressor, a condenser, an evaporator, a capillary tube, a dryer, or an accumulator that is connected to the refrigerant pipes.

17. The refrigerant pipe fitting of claim 1, wherein the refrigerant pipe fitting is configured to receive the inner pipe that is inserted into the out pipe and has a sealing agent applied between an outer surface of the inner pipe and an inner surface of the out pipe.

18. The refrigerant pipe fitting of claim 1, wherein the second end of the refrigerant pipe fitting is configured to protrude outward in a first direction relative to the end of the out pipe in the state in which the refrigerant pipe fitting is mounted on the out pipe by restraint of the hook, and wherein the refrigerant pipe fitting is configured to, based on the inner pipe being inserted into the out pipe in a second direction opposite to the first direction, move along the outer surface of the out pipe in the second direction to thereby press the outer surface of the out pipe.

19. A refrigerant pipe fitting that is configured to connect to one or more pipes, the refrigerant pipe fitting comprising:

an out pipe opening defined at a first end of the refrigerant pipe fitting and configured to receive an out pipe;

an inner pipe opening defined at a second end of the refrigerant pipe fitting and configured to receive an inner pipe that is configured to be inserted into the out pipe disposed inside the refrigerant pipe fitting;

a pressing portion that defines a part of an inner surface of the refrigerant pipe fitting, the refrigerant pipe fitting having an inner diameter that becomes narrower in a direction from the out pipe opening toward the inner pipe opening and being configured to press and deform the out pipe toward the inner pipe based on moving relative to the out pipe to connect the out pipe with the inner pipe;

a fastening portion defined on the inner surface of the refrigerant pipe fitting between the pressing portion and the out pipe opening, the fastening portion being configured to couple to an end of the out pipe to thereby restrict separation of the out pipe from the refrigerant pipe fitting; and a tail portion configured to receive an expanded pipe portion of the out pipe disposed at the end of the out pipe, the tail portion being disposed between the pressing portion and the inner pipe opening, the inner diameter of the refrigerant pipe fitting at the tail portion being larger than the inner diameter of the refrigerant pipe fitting at the pressing portion.

20. A refrigerant pipe fitting that is configured to connect to one or more pipes, the refrigerant pipe fitting comprising:

an out pipe opening defined at a first end of the refrigerant pipe fitting and configured to receive an out pipe;

an inner pipe opening defined at a second end of the refrigerant pipe fitting and configured to receive an inner pipe that is configured to be inserted into the out pipe disposed inside the refrigerant pipe fitting;

a pressing portion that defines a part of an inner surface of the refrigerant pipe fitting, the refrigerant pipe fitting having an inner diameter that becomes narrower in a direction from the out pipe opening toward the inner pipe opening and being configured to press and deform the out pipe toward the inner pipe based on moving relative to the out pipe to connect the out pipe with the inner pipe; and a fastening portion defined on the inner surface of the refrigerant pipe fitting between the pressing portion and the out pipe opening, the fastening portion being configured to couple to an end of the out pipe to thereby restrict separation of the out pipe from the refrigerant pipe fitting, wherein the pressing portion comprises a plurality of inclined portions that are arranged along an axis extending from the out pipe opening toward the inner pipe opening and have a plurality of slopes with respect to the axis, and wherein the plurality of slopes decrease from the out pipe opening toward the inner pipe opening.

* * * * *